(12) United States Patent
Sankrithi

(10) Patent No.: US 11,274,648 B2
(45) Date of Patent: Mar. 15, 2022

(54) PUMPED STORAGE SYSTEM WITH WATERFALL CONTROL SUBSYSTEM

(71) Applicant: Mithra Sankrithi, Bremerton, WA (US)

(72) Inventor: Mithra Sankrithi, Bremerton, WA (US)

(73) Assignee: RIC Enterprises, Bremerton, WA (US)

( * ) Notice: Subject to any disclaimer, the term of this patent is extended or adjusted under 35 U.S.C. 154(b) by 0 days.

(21) Appl. No.: 16/741,753

(22) Filed: Jan. 14, 2020

(65) Prior Publication Data

US 2021/0215128 A1 Jul. 15, 2021

(51) Int. Cl.
*F03B 13/06* (2006.01)
*F03B 15/02* (2006.01)
*F03B 13/10* (2006.01)

(52) U.S. Cl.
CPC .............. *F03B 13/06* (2013.01); *F03B 13/10* (2013.01); *F03B 15/02* (2013.01)

(58) Field of Classification Search
CPC ........... F03B 13/06; F03B 13/10; F03B 15/02
USPC .......................................................... 60/398
See application file for complete search history.

(56) References Cited

U.S. PATENT DOCUMENTS

| | | | | |
|---|---|---|---|---|
| 3,838,886 A * | 10/1974 | Kilroy | ..................... | E21C 41/22 299/18 |
| 3,939,356 A * | 2/1976 | Loane | ....................... | F02C 6/16 290/52 |
| 4,265,599 A * | 5/1981 | Morton | ..................... | F04F 1/06 417/101 |
| 4,282,444 A * | 8/1981 | Ramer | .................... | F03B 13/06 290/52 |
| 4,307,299 A * | 12/1981 | Norton | ...................... | F02C 6/16 290/52 |
| 4,408,452 A * | 10/1983 | Tsunoda | .................... | F03B 3/10 60/398 |
| 4,443,707 A * | 4/1984 | Scieri | ...................... | F03B 13/06 290/4 R |
| 4,965,998 A * | 10/1990 | Estigoy | .................. | F03B 13/06 60/325 |
| 5,472,312 A * | 12/1995 | Takeda | ..................... | G05D 9/12 415/17 |
| 5,864,183 A * | 1/1999 | Fisher, Jr. | ............... | F03B 13/06 290/43 |

(Continued)

*Primary Examiner* — Michael Leslie

(57) ABSTRACT

The invention provides a pumped storage system with waterfall control subsystem, architected to enable optimized achievement of two primary goals in the context of a geography with upper and lower water bodies such as lakes, which are connected by a river with a waterfall. The first primary goal comprises energy storage utilizing a pumped storage system between two water bodies of different elevation, which can store energy from excess power production periods and return that energy by producing power to fill needs during deficit power production periods. The second primary goal comprises touristic value & waterfall viewer satisfaction combined with environmental & ecological objectives. A multiobjective control subsystem is utilized for synthesis of time-domain control commands aimed towards optimized achievement of the aforesaid two primary goals, and for control of the pumped storage system with waterfall control subsystem responsive to these time-domain control commands.

20 Claims, 20 Drawing Sheets

(56) References Cited

U.S. PATENT DOCUMENTS

| | | | | |
|---|---|---|---|---|
| 7,257,946 B2* | 8/2007 | Welch, Jr. | ............... | F03B 13/24 |
| | | | | 60/398 |
| 7,918,087 B1* | 4/2011 | Brown | .................... | F03B 17/06 |
| | | | | 60/398 |
| 8,127,542 B1* | 3/2012 | Dolcimascolo | ......... | F03B 13/06 |
| | | | | 60/398 |
| 8,333,070 B2* | 12/2012 | Huang | .................... | F03B 13/06 |
| | | | | 60/497 |
| 9,151,269 B2* | 10/2015 | Han | ...................... | F03B 13/264 |
| 9,494,127 B2* | 11/2016 | Hongawa | .................. | F03B 3/10 |
| 9,541,057 B2* | 1/2017 | Longobardi | ............ | F03B 15/14 |
| 2012/0187692 A1* | 7/2012 | Walton | .................... | F03B 13/08 |
| | | | | 290/54 |
| 2018/0023538 A1* | 1/2018 | Prill | ......................... | F03G 7/10 |
| | | | | 416/117 |
| 2018/0100480 A1* | 4/2018 | Duquette | ............... | G05B 15/02 |
| 2018/0348013 A1* | 12/2018 | Farahmand | ............ | G06N 7/005 |

* cited by examiner

PUMPED STORAGE SYSTEM WITH WATERFALL CONTROL SUBSYSTEM

BACKGROUND OF THE INVENTION

As the World's human population grows and as the global economy grows, the energy demand of our global population also grows. With limited availability of fossil fuels and associated adverse impacts such as climate change effects caused by $CO_2$ emissions, energy production is appropriately and increasingly moving to renewable energy sources such as solar energy and wind energy. However, renewable energy sources tend to have variations in power production with time, such as loss of solar power at night or periods of cloud cover, loss of wind power during periods of light wind or still air, and loss of tidal stream power during certain phases of lunar positioning. The occurrence of renewable power harvesting variability due to meteorological effects, daily effects, solar & lunar positioning effects, seasonal effects, and climate change effects have been confirmed by scientific studies and are the subject of further ongoing scientific studies. For sufficient power to be available to meet user power needs as a function of time, renewable power sources therefore typically need supplementation with either or both of (i) an energy storage system and/or (ii) an intermittent power production system such as a rapid-response gaseous fuel-powered generator system. The need for supplementation becomes increasingly critical as higher and higher levels of renewable energy penetration is integrated into electrical grids and smart grids. Energy storage systems known in the prior art include batteries, other chemical storage systems, thermal storage systems, kinetic energy storage systems such as flywheels, and potential energy storage systems such as pumped storage. The present invention provides a new improvement in the field of pumped storage systems, with a pumped storage system specifically architected to store gravitational potential energy in the upper of two water bodies of different elevation that are also connected by a river and a waterfall that has some touristic value, whilst aiming at achieving multiple objectives. One primary example of this constitutes the case of Lake Erie and Lake Ontario connected by the Niagara River and Niagara Falls, with a pumped storage system and waterfall control subsystem that stores gravitational potential energy in water pumped from Lake Ontario to Lake Erie while also controlling waterfall features and attributes, including touristic attributes, at Niagara Falls.

BRIEF SUMMARY OF THE INVENTION

In summary, this invention provides a pumped storage system with waterfall control subsystem that is architected to foster achievement of two primary goals in the context of a geography with upper and lower water bodies that are connected by a river with a waterfall. The first primary goal comprises energy storage utilizing a pumped storage system between the two water bodies of different elevation, where the pumped storage system can store energy from excess electric power production periods and return that energy by producing electric power to fill needs during deficit power production periods. The second primary goal comprises touristic value & waterfall viewer satisfaction combined with environmental, ecological & erosion impact limiting objectives. A multiobjective control subsystem is utilized for synthesis of time-domain control commands aimed towards optimized achievement of the aforesaid two primary goals and other optional additional goals, and for control of the pumped storage system with waterfall control subsystem responsive to these time-domain control commands.

DETAILED DESCRIPTION OF THE INVENTION

Figure 1A:
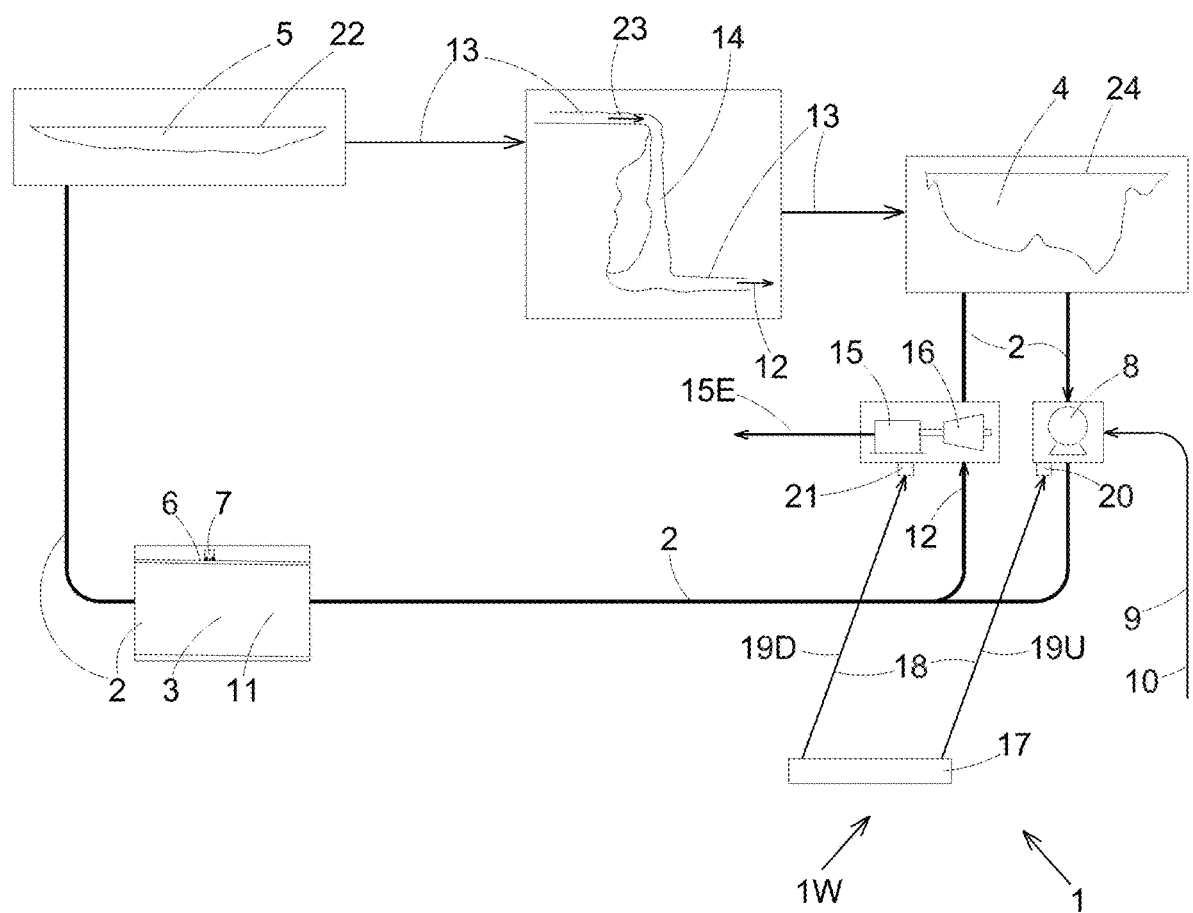
FIGS. 1A, 1B and 1C show schematic diagrams of certain preferred embodiments of a pumped storage system with waterfall control subsystem, where the pumped storage system transfers water between two water bodies with different elevation, and where the water bodies are also connected by a river with a waterfall.

Prior to commencing with the detailed description, certain expressions are defined as pertaining to their use in the following detailed description and claims.

The expression "river" is to be understood as including a river, a stream, a rivulet, a creek, or a channel capable of transporting water that is moving at least in part from gravitational force.

The expression "waterfall" is to be understood to include any and all of a waterfall, a seasonal waterfall, rapids that shall be construed as comprising a waterfall on a micro-scale, and gravity-driven water flow in a channel over a portion of the channel course wherein the streamwise flowing water surface contour includes a portion of increased downward streamwise slope relative to an adjacent water surface area, which portion of increased downward streamwise slope would be visible to an observer, tourist or camera.

The expression "water body" is to be understood as including a lake, a reservoir, a pond, a tank, a lagoon, a bay, an inlet, a sound, a sea, an ocean or other water body as known in the art.

The expression "water flow rate" is to be understood to include water volumetric flow rate (e.g., as measured in cubic meters per second), mass flow rate (e.g., as measured in kilograms per second), or velocity (e.g., as measured in meters per second).

The expression "time-domain control command" is to be understood to refer to control signals or commands as a function of time, with the understanding that control algorithms or control laws that generate the control commands may be in either or both time-domain and frequency-domain, but ultimately control of pumps, turbines, valves, actuators and other equipment must be physically implemented in the time-domain as these devices exist and operate in space and time.

The expression "pump" is to be understood to include positive displacement pumps, centrifugal pumps, roto-dynamic pumps, rotary vane pumps, axial-flow pumps, gear pumps, screw pumps, impulse pumps, velocity pumps, reciprocating pumps, vibratory pumps, integrated pump turbines and other pumps as known in the art.

The expression "turbine" is to be understood in its most general sense to encompass any device that converts fluid kinetic energy into mechanical kinetic energy, and inclusive of devices of classes such as axial-flow turbines, screw turbines, radial turbines, Francis turbines, Kaplan turbines, Pelton turbines, Turgo turbines, crossflow turbines, statorless turbines, shroudless turbines, bladeless turbines, water engines, water motors, integrated pump turbines and other turbines as known in the art.

The expression "generator" is to be understood to include electromagnetic generators, dynamos, alternators, DC generators, AC generators, induction generators, homopolar generators, variable speed generators, constant speed generators, variable frequency generators, constant frequency generators, generators with different voltage, amperage and wattage characteristics, and other generators as known in the art.

The expression "vehicle" is to be understood to include cars, vans, trucks, buses, motorcycles, road vehicles, motor vehicles, trains, trams, streetcars, monorail vehicles, MAGLEV vehicles, Hyperloop vehicles, aircraft on the ground surface on landing gear, boats, water vehicles, ships, barges, hovercraft, hydrofoils, submarines and other vehicles as known in the art.

The expression "surface corridor" is to be understood to include a transport right-of-way, a roadway, a railway track, a MAGLEV or Hyperloop track, a waterway, a vehicle pathway or other surface corridor as known in the art.

Figure 1B:
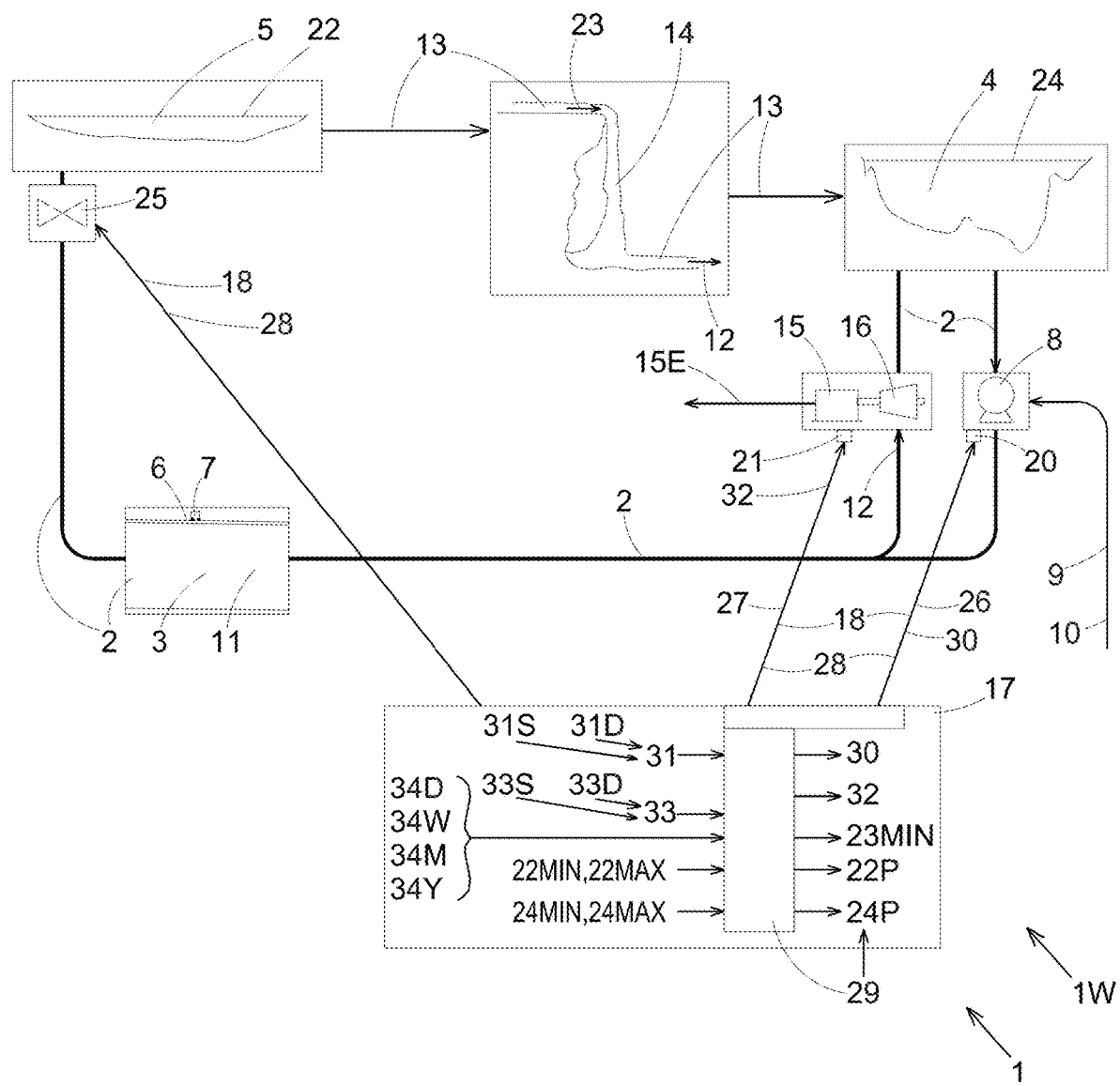
Figure 1C:
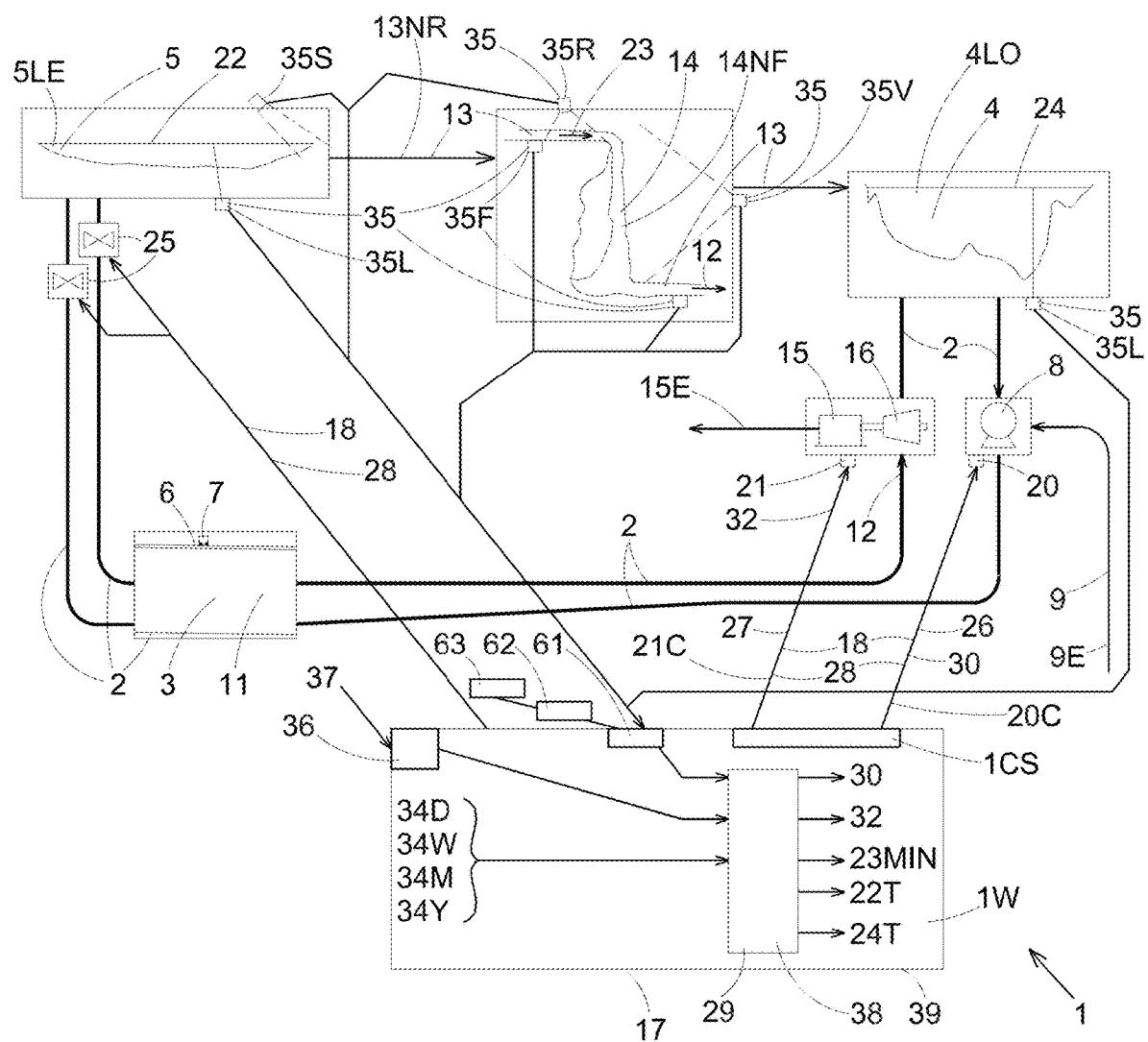

FIGS. 1A, 1B and 1C show schematic diagrams of certain preferred embodiments of a pumped storage system with waterfall control subsystem, where the pumped storage system transfers water between two water bodies with different elevation, and where the water bodies are also connected by a river with a waterfall.

FIG. 1A illustrates a pumped storage system with waterfall control subsystem 1, comprising in combination:

a pressure-containing pipe 2 providing a pressure-containing water connection path 3 between a lower elevation water body 4 and an upper elevation water body 5, said pressure-containing pipe 2 at least partially traversing beneath a surface corridor 6 suitable for supporting a vehicle 7 thereupon;

a pump 8 for using input energy 9 including renewable energy 10 in a surplus power production time window, to pump water 11 from said lower elevation water body 4 to said upper elevation water body 5 through said pressure-containing pipe 2 with an upward water flow with opposed direction relative to a natural gravity driven downward water flow 12 through a river 13 and a waterfall 14 from said upper elevation water body 5 to said lower elevation water body 4;

a generator 15 for generating electrical power 15E in a deficit power production time window, from gravity driven downward water flow 12 from said upper elevation water body 5 to said lower elevation water body 4 through at least portions of said pressure-containing pipe 2 and through a turbine 16 connected to said pressure-containing pipe 2, wherein said turbine 16 drives said generator 15;

and a multiobjective control subsystem 17 for control of said pumped storage system with waterfall control subsystem 1, said multiobjective control subsystem 17 generating time-domain control commands 18 including an upward flow rate command component 19U to a pump control subsystem 20 acting on said pump 8 and a downward flow rate command component 19D to a generator control subsystem 21 acting on said generator 15 and associated subsystems; and said multiobjective control subsystem 17 serving: (i) as means for controlling the water level in the upper elevation water body 22 to at least one of lie above an upper minimal specified value as a function of time and lie below an upper maximal specified value as a function of time; (ii) as means for controlling the water flow rate over the waterfall 23 to at least one of lie above a minimal waterfall flow rate as a function of time and lie below a maximal waterfall flow rate as a function of time; and (iii) as means for controlling the water level in the lower elevation water body 24 to at least one of lie above a lower minimal specified value as a function of time and lie below a lower maximal specified value as a function of time.

In one exemplary preferred embodiment, the pumped storage system with waterfall control subsystem 1 may include redundancy of elements and/or subsystems along with redundancy management subsystem(s), to improve fault tolerance and continued operation of the system following the occurrence of one or more failures or faults. In this manner the multiobjective control subsystem 17 that is part of the waterfall control subsystem 1W may also be implemented in a computer or a set of similar or dissimilar computers with redundancy and redundancy management for fault tolerance.

In an exemplary highly preferred embodiment, the upper elevation water body 5 is Lake Erie, the lower elevation water body 4 is Lake Ontario, and the waterfall 14 is Niagara Falls. It should be understood that other preferred embodiments are also possible within the spirit and scope of the invention as defined in the claims. Without limitation, some examples of such other embodiments could be potential pumped storage systems (i) between Geiranger Fjord (lower elevation water body, an arm of the ocean) and Lake Skagedalsvatnet (upper elevation water body) connected by a Geitelva stream and the Brudesloret waterfalls in Norway; (ii) between Beauly Firth or Moray Firth (lower elevation water body, an arm of the ocean) and Loch Ness (upper elevation water body) connected by the River Ness and rapids therein that constitute micro-scale waterfalls in Scotland; (iii) between the Dead Sea (lower elevation water body) and the Sea of Galilee (upper elevation water body) connected by the Jordan River in the border area between Israel and Jordan, with small waterfalls associated with the waterworks in the Island of Peace area; and (iv) between the salt water lakes Assal (lower elevation water body) and Ghoubet (upper elevation water body) in Djibouti, where Lake Assal is well below sea level and Lake Ghoubet is substantially at sea level being a lagoon from the ocean, wherein a small waterfall feature could be in a natural or man-made stream feeding the lower lake.

Note that using input energy 9 including renewable energy 10 in a "surplus power production time window" refers to a time window when electrical power production feeding into an electrical grid, inclusive of the aforementioned renewable energy power production sources but excluding the pumped storage system or other storage systems, less the grid customers net power consumption, is a positive value indicating surplus power production. In a similar vein, note that a "deficit power production time window" refers to a time window when electrical power production feeding into an electrical grid, excluding the pumped storage system or other storage systems, less the grid customers net power consumption, is a negative value indicating deficit power production. To further clarify, it is useful to cite just one simple example, where a "surplus power production time window" could occur in the daytime on a cloudless day, when a large number of solar power harvesting systems are feeding excess power into the electrical grid, with the surplus being available to pump water to a higher elevation water body 5 in a pumped storage system. Similarly, to cite just one simple example, a "deficit power production time window" could occur in the evening after sunset, when all the solar power harvesting systems are receiving no insolation and yet customers power demand is high, with the deficit being "fillable" at least in part by running previously pumped water down from an upper elevation water body 5 and through a turbine 16 that drives a generator 15 feeding electric power 15E into the grid. These simple examples should not be deemed to limit the invention as further described and claimed herein.

Note that the means for controlling the water level in the upper elevation water body 22, the waterfall control subsystem 1W including means for controlling the water flow rate over the waterfall 23, and means for controlling the water level in the lower elevation water body 24 may all comprise direct and/or indirect means, and use a large variety of inputs, control laws/control algorithms, and outputs acting on a variety of control subsystems or effectors.

FIG. 1B illustrates another preferred embodiment of the invention similar to that of FIG. 1A, showing a pumped storage system with waterfall control subsystem 1, comprising in combination:

a pressure-containing pipe 2 providing a pressure-containing water connection path 3 between a lower elevation water body 4 and an upper elevation water body 5, said pressure-containing pipe at least partially traversing beneath a surface corridor 6 suitable for supporting a vehicle 7 thereupon;

a pump 8 for using input energy in a pumping time window 26 to pump water 11 from said lower elevation water body 4 to said upper elevation water body 5 through said pressure-containing pipe 2 with an upward water flow with opposed direction relative to a natural gravity driven downward water flow 12 through a river 13 and a waterfall 14 from said upper elevation water body 5 to said lower elevation water body 4;

a generator 15 for generating electrical power 15E in a generating time window 27, from gravity driven downward water flow 12 from said upper elevation water body 5 to said lower elevation water body 4 through at least portions of said pressure-containing pipe 2 and through a turbine 16 connected to said pressure-containing pipe 2, wherein said turbine 16 drives said generator 15;

and a multiobjective control subsystem 17 for:

I) synthesis of time-domain control commands 18 for (i) said pumping time window 26, (ii) said generating time window 27 and (iii) a water flow rate command 28 for water flow in said pressure-containing pipe 2; and for II) control of said pumped storage system with waterfall control subsystem, responsive to said time-domain control commands 18;

said control commands 18 dependent on plural command synthesis functions 29 wherein the command synthesis functions 29 comprise:

a) a command synthesis function for an upward flow rate command component 30 to a pump control subsystem 20 acting on said pump 8, said upward flow rate command component 30 dependent on surplus 31 of a first electric power supply 31S over a first electric power demand 31D;

b) a command synthesis function for a downward flow rate command component 32 to a generator control subsystem 21 acting on said generator 15 and associated subsystems, said downward flow rate command component 32 dependent on deficit 33 of a second electric power supply 33S relative to a second electric power demand 33D;

c) a command synthesis function for maintaining water flow rate over said waterfall 23 to at least a minimum specified value 23MIN, said minimum specified value being at least one of a first function of time of day 34D and a second function of time of week 34W and a third function of time of month 34M and a fourth function of time of year 34Y;

d) a command synthesis function for maintaining an upper water level parameter 22P in said upper elevation water body at least one of: above an upper minimal specified value as a function of time 22MIN and below an upper maximal specified value as a function of time 22MAX; and e) a command synthesis function for maintaining a lower water level parameter 24P in said lower elevation water body at least one of: above a lower minimal specified value as a function of time 24MIN and below a lower maximal specified value as a function of time 24MAX.

Note that the third function of time of month 34M may be a function of time of a solar calendar month or lunar month in variant embodiments. The lunar month dependency may be appropriate for certain functionality associated with a pumped storage system with waterfall control subsystem 1, wherein some of the input energy comes from tidal power sources which are dependent on lunar positioning relative to local Earth surface positioning.

In FIG. 1B the time-domain control commands 18 and the water flow rate command 28 are also transmitted from the multiobjective control system 17 to a controllable valve 25 that is located in the pressure-containing pipe 2 at or close to the upper elevation water body 5. It should be noted that the waterfall control subsystem 1W and the command synthesis functions 29 can optionally also be dependent on other sensor inputs, operator inputs and/or computed inputs from control laws or control algorithms, in variant preferred embodiments of the invention. To cite one example, the command synthesis functions could be dependent on current or forecast water levels and/or precipitation in the upper Great Lakes such as Lake Huron, Lake Michigan and Lake Superior, as well as surrounding land areas. To cite another example, the command synthesis functions could be dependent on water levels and/or water flow and/or precipitation in the St. Lawrence River and St. Lawrence Seaway. To cite another example, the command synthesis functions could be dependent on sensor outputs or parameters indicative of erosion and/or environmental and/or ecological impacts or metrics. The command synthesis functions can incorporate control law features and aspects known from the prior art of computer implemented control laws or control algorithms, including Proportional-Integral-Differential or "PID" control elements, monotonic function elements as variants of proportional elements, double or triple integral elements as variants of integral elements, double or triple differential elements as variants of differential elements, magnitude limiting elements, rate limiting elements, deliberate hysteresis elements and smart grid bidirectional feedback elements, in various preferred embodiments of the invention. The pumped storage system with waterfall control subsystem 1 can incorporate features to enhance reliability, testability, maintainability, resiliency and repairability as known in the prior art of the design, build, operation, test, maintenance and repair of large-scale systems with multiple objectives. Plural sensors and plural computers and plural operator interface elements may also be included in different preferred embodiments, along with redundancy management subsystems for fault tolerance and artificial intelligence, machine learning and adaptive control subsystems where these could benefit overall system performance and multi-objective optimization under variable constraints, for normal and non-normal operations.

As in the case of the embodiment described for FIG. 1A, the pumped storage system with waterfall control subsystem 1 may include redundancy of elements and/or subsystems along with redundancy management subsystem(s), to improve fault tolerance and continued operation of the system following the occurrence of one or more failures or faults. Redundancy can be provided in numbers and types of pipes, valves, plumbing elements, pumps, turbines, generators, wiring, electrical elements, power management subsystems, sensors, monitoring subsystems, control subsystems, grid integration subsystems, smart grid subsystems, safety subsystems and security subsystems along with interconnectivity and switching and intervention architectures connecting all of the aforesaid. To cite just one example, multiple pressure-containing pipe paths may be provided and multiple valves near the top and bottom ends of pressure-containing pipes, to minimize risk of fault or failure conditions resulting in serious consequences such as uncommanded water flow from the upper elevation water body to the lower elevation water body through the pressure-containing pipe. In this manner the multiobjective control subsystem 17 that is part of the waterfall control subsystem 1W may also be implemented in a computer or a set of similar or dissimilar computers with redundancy and redundancy management for fault tolerance. Signal Selection and Failure Detection (SSFD) algorithms may be employed as known in the prior art of fault tolerant systems design.

In a particular exemplary preferred embodiment of the class illustrated in FIG. 1B, a pumped storage system with waterfall control subsystem 1 is shown, wherein the first electric power supply 31S comprises daytime electric power supply including power from solar energy harvesting, first electric power demand 31D comprises a daytime electric power demand, second electric power supply 33S comprises nighttime electric power supply not accounting for any power from a rapid-response gas-fueled or liquid-fueled (e.g. oil-fueled) power station, and second electric power demand 33D comprises a nighttime electric power demand.

FIG. 1C illustrates another preferred embodiment of the invention similar to those of FIG. 1A and FIG. 1B and sharing several common features thereto, now showing a pumped storage system with waterfall control subsystem 1, comprising in combination:
a pressure-containing pipe 2 providing a pressure-containing water connection path 3 between a lower elevation water body 4 and an upper elevation water body 5, said pressure-containing pipe 2 at least partially traversing beneath a surface corridor 6 suitable for supporting a vehicle 7 thereupon;
a pump 8 for using input energy 9 comprising electrical energy 9E in a pumping time window 26, to pump water 11 from said lower elevation water body 4 to said upper elevation water body 5 through said pressure-containing pipe 2 with an upward water flow with opposed direction relative to a natural gravity driven downward water flow 12 through a river 13 and a waterfall 14 from said upper elevation water body 5 to said lower elevation water body 4;
a generator 15 for generating electrical power 15E in a generating time window 27, from gravity driven downward water flow 12 from said upper elevation water body 5 to said lower elevation water body 4 through at least portions of said pressure-containing pipe 2 and through a turbine 16 connected to said pressure-containing pipe 2, wherein said turbine 16 drives said generator 15;
and a waterfall control subsystem 1W comprising in combination:
i) at least one of (a) sensor means 35 for sensing at least one of water level and water flow rate and water image, and (b) forecast receiving means 36 for receiving meteorological forecast data 37 on at least one of future precipitation, future temperature, future insolation and future wind;
ii) computer target generation means 38 for effectively defining at least one of a future time window upper elevation water body level target function 22T and a future time window waterfall flow rate target function 24T, said target functions being dependent on at least one of said meteorological forecast data 37 and on some data from said sensor means 35; and
iii) control system means 1CS dependent on some data from said sensor means 35 and also dependent on at least one of said target functions, for generating and transmitting pump control commands 20C to said pump 8 and generator control commands 21C to said generator 15 and associated subsystems.

In the illustrated embodiment of FIG. 1C separate pressure-containing pipes 2 are shown for the upward and downward water flow paths between the lower elevation water body 4 and the upper elevation water body 5, with the upward water flow path through the pump 8 and the downward water flow path through the turbine 16. Variants of the embodiments of FIGS. 1A, 1B and 1C could have common path elements of pressure-containing pipe 2 and/or separate path elements for upward and downward flow, within the spirit and scope of the invention as claimed. In the illustrated embodiment of FIG. 1C, note that the sensor means 35 for sensing at least one of water level and water flow rate and water image, here include all of a water level sensor 35L for sensing water level, and a water flow rate sensor 35F for sensing water flow rate, and a camera 35V such as a visual image sensor as an example, for sensing water image that may include sensing of visual aspects of waterfall stream pattern, waterfall spray pattern and waterfall mist pattern. Note that camera 35V may be a fixed or movable camera, may have remote-controlled aiming, positioning and/or control, may be mounted on a tower or supported by floating buoy or a tethered balloon, and/or may be mounted on a vehicle such as a water vehicle (e.g. boat such as the "Maid of the Mist" tourist boat below Niagara Falls), land vehicle and/or air vehicle (e.g., drone or Unmanned Aerial Vehicle). The camera/visual image sensor may be connected to or integrated with an image recognition subsystem, artificial intelligence subsystem and/or machine learning subsystem, including measures of tourist satisfaction for various aspects of various parts of the waterfalls, such as for example different views of different portions of the Horseshoe Falls and the American Falls at Niagara Falls. The sensor means 35 also show a river sensor 35R and a shoreline sensor 35S. The river sensor 35R may measure river flow rate, velocity field, depth, turbidity, riverbed erosion, and image sensing to enable pattern recognition and machine learning and artificial intelligence methods to be applied for measures and parameters of river health such as measures related to hydrology, geology, ecology, chemistry, physics, environmental science, and safety and health of living creatures in the river. The shoreline sensor 35S may measure shoreline location variations with water level, shoreline recession/movement due to sand shifting or surface erosion/deposition, wave effects, and image sensing to enable pattern recognition and machine learning and artificial intelligence methods to be applied for measures and parameters of shoreline health such as measures related to hydrology, geology, geography, ecology, chemistry, physics, environmental science, and safety and health of living creatures in the shoreline area. Additional sensors, not shown, could include upper elevation water body sensors, lower elevation water body sensors, land area sensors, atmosphere area sensors, and underwater sensors. Sensors can sense/measure many types of parameters such as those related to physics, chemistry and biology, and provide data that can be manipulated by computers to make a variety of assessments including environmental, ecological, erosion and safety assessments. Of course, plural sensors of each sensor may be employed beneficially to enable better system optimization and/or better fault tolerance through redundancy management.

In the illustrated embodiment of FIG. 1C the waterfall control subsystem 1W can, in a variant preferred embodiment, set a future time window upper elevation water body level target function 22T so that it has one or more of:

(i) A scheduled increasing value component in sunny day daylight hours when insolation falling on a solar energy harvesting subsystem is feeding electrical energy 9E in a pumping time window 26 to pump 8

(ii) A scheduled increasing value component in windy condition hours when a wind energy harvesting subsystem is feeding electrical energy 9E in a pumping time window 26 to pump 8

(iii) A scheduled increasing value component in time windows when at least one of a tidal energy harvesting system and a hydrokinetic energy harvesting system and a renewable thermal energy harvesting system is feeding electrical energy 9E in a pumping time window 26 to pump 8

(iv) A scheduled decreasing value component in night or cloud-cover hours when in a generating time window 27

(v) A scheduled decreasing value component in nonwindy condition hours (vi) A scheduled decreasing value component in conditions of below threshold output from at least one of a tidal energy harvesting system and a hydrokinetic energy harvesting system and a renewable thermal energy harvesting system (vii) A scheduled decreasing value component in conditions of above threshold precipitation in a water basin feeding water into the upper elevation water body 5, such as the upper Great Lakes (Huron, Michigan and Superior) draining water into Lake Erie (viii) A not-to-exceed limit value to prevent property damage to shoreline properties on the shores of the upper elevation water body 5

(ix) A not-to-exceed water body level rate to keep shoreline erosion below a specified threshold value or function.

In the illustrated embodiment of FIG. 1C the waterfall control subsystem 1W can, in a variant preferred embodiment, set a future time window waterfall flow rate target function 24T so that it has one or more of:

(i) A scheduled increasing value component in sunny day daylight hours when insolation falling on a solar energy harvesting subsystem is feeding electrical energy 9E in a pumping time window 26 to pump 8

(ii) A scheduled increasing value component in windy condition hours when a wind energy harvesting subsystem is feeding electrical energy 9E in a pumping time window 26 to pump 8

(iii) A scheduled increasing value component in time windows when at least one of a tidal energy harvesting system and a hydrokinetic energy harvesting system and a renewable thermal energy harvesting system is feeding electrical energy 9E in a pumping time window 26 to pump 8

(iv) A scheduled decreasing value component in night or cloud-cover hours when in a generating time window 27

(v) A scheduled decreasing value component in nonwindy condition hours (vi) A scheduled decreasing value component in conditions of below threshold output from at least one of a tidal energy harvesting system and a hydrokinetic energy harvesting system and a renewable thermal energy harvesting system (vii) A not-to-exceed upper limit value to limit erosion of at least one of said waterfall 14 and said river 13

(viii) A not-to-exceed lower limit value so as not to harm touristic value for tourists experiencing the waterfall 14, including considerations of sight, sound and spray patters in applicable current and forecast weather and wind and lighting conditions.

FIG. 1C illustrates a pumped storage system with waterfall control subsystem 1, further comprising a camera 35V capturing a view of said waterfall 14 and an image analysis program acting on said view to compute a visual appeal parameter, and wherein said visual appeal parameter is an input to said waterfall control subsystem 1W. Note that the camera 35V may be a visual image sensor and/or an imaging sensor working at radiation frequencies outside normally visible frequencies and/or an imaging sensor working on other principles of physics, e.g. doppler radar, LIDAR, ultrasound imaging and other imaging devices and subsystems known from the prior art of imaging technologies. Output from the camera 35V or plural cameras can be processed by pattern recognition and image recognition and image stitching methods, along with optional expert systems and artificial intelligence methods, to compute one or more visual appeal parameters, also considering times when more tourists are present, lighting conditions, cloud cover conditions, wind conditions, spray and mist pattern conditions, and other quantifiable and nonquantifiable considerations. Use of past, current and projected/forecast future visual appeal parameter values can also be used as inputs to command synthesis functions 29 for maintaining appropriate water flow rate and flow patterns over the waterfall 14.

FIG. 1C also illustrates a pumped storage system with waterfall control subsystem 1, further comprising the multiobjective control subsystem 17 also serving as erosion management means 39 for limiting erosion of at least one of said lower elevation water body 4, said upper elevation water body 5, said river 13 and said waterfall 14. For example and without limitation, shoreline erosion can be kept within acceptable limits by reducing rate of change of water level in the upper elevation water body 5 and lower elevation water body 4, riverbed and waterfall erosion in the river 13 can be kept within acceptable limits by controlling one or both of upper elevation water body water level and/or river & waterfall flow rate and/or velocity distributions. Based on modeling of erosion as a function of key driving parameters (e.g., water flow rates, velocity fields, turbidity and sediment transport, waves and currents and winds and surface ice, tidal effects, underwater surface topography, soil and sand and rock characteristics, and other parameters) and the derivatives (including single derivatives and multiple derivatives) and integrals (including single integrals and multiple integrals) and frequency-filtered modifications of those parameters, control laws can be implemented to mitigate erosion and keep it within acceptable limits, where the control laws implement known techniques of open-loop control, closed-loop control, proportional-integral-derivative control, target-following control and optimal control to achieve the desired multiobjective optimization whilst managing control stability requirements, fault tolerance and reconfiguration, and power loss mechanisms minimization. Erosion-driven waterfall location geographical retreat progression with time can also be similarly be kept within limits that are deemed acceptable.

FIG. 1C also illustrates a pumped storage system with waterfall control subsystem 1, further comprising a monitoring subsystem 61 for receiving sensor inputs and synthesizing for monitoring at least one of an environmental parameter and an erosion parameter and an ecological parameter; further comprising an operator interface subsystem 62 for an operator 63 to monitor information from said monitoring subsystem and for said operator to make command inputs; and further comprising override means for transmitting an override command to said multiobjective control subsystem wherein said override command is issued from at least one of said operator interface subsystem and said monitoring subsystem. The operator interface subsystem 62 may include information displays to provide information to the operator for normal and non-normal operation of the pumped storage system with waterfall control subsystem 1, including advisory, caution and warning indications and information to the operator by visual, aural and tactile means. Safety related monitoring including video monitoring (from fixed cameras, aimable cameras, scanning cameras and vehicle mounted cameras such as drone-mounted cameras) can be provided, to alert an operator to potential safety hazards to humans such as swimmers, divers, people in boats or submarines or other vehicles, marine animals and fish, land animals, birds and bats, and other potential life forms that may face hazards or threats. Security related monitoring can also be provided, with sensing, monitoring, threat-detection, threat-identification and warning and protective systems (e.g. with loudspeakers, lights and displays as well as potentially fences with electric actuation and remote-control protection & rescue systems and remote-control defensive or offensive weaponry). Security systems should ideally provide enhanced security relative to a variety of human and non-human threats, including hackers, cybercriminals, criminals, vandals, thieves, saboteurs and terrorists.

FIG. 1C also illustrates a pumped storage system with waterfall control subsystem 1, for the particular highly preferred embodiment (without limitation) wherein said lower elevation water body 4 comprises Lake Ontario 4LO, said upper elevation water body 5 comprises Lake Erie 5LE, said river 13 comprises the Niagara River 13NR and said waterfall 14 comprises Niagara Falls 14NF.

The preferred embodiments shown in FIGS. 1A, 1B and 1C are all architected to foster achievement of two primary goals in the context of a geography with upper and lower water bodies that are connected by a river with a waterfall. The first primary goal comprises energy storage utilizing a pumped storage system between the two water bodies of different elevation, where the pumped storage system can store energy from excess electric power production periods and return that energy by producing electric power to fill needs during deficit power production periods. The second primary goal comprises touristic value & waterfall viewer satisfaction combined with environmental, ecological & erosion impact limiting objectives. The pumped storage system with waterfall control subsystem 1 may incorporate substantial sophistication in optimally fulfilling multiple objectives while abiding by multiple constraints or limits, keeping in account variations with time of solar power, wind power, other applicable renewable and nonrenewable energy sources that can feed power into an electric grid/smart grid, consumer net power use, Upper Great Lakes precipitation, overall power in to the pumped storage system, overall power out of the pumped storage system, upper elevation water body level, lower elevation water body level, and waterfall flow rate. In view of the very large set of permutations of these parameters, it is not feasible to capture the waterfall control subsystem's operation in a few representative simple graphs, which is the reason such simple graphs are not herein provided.

Figure 2A:
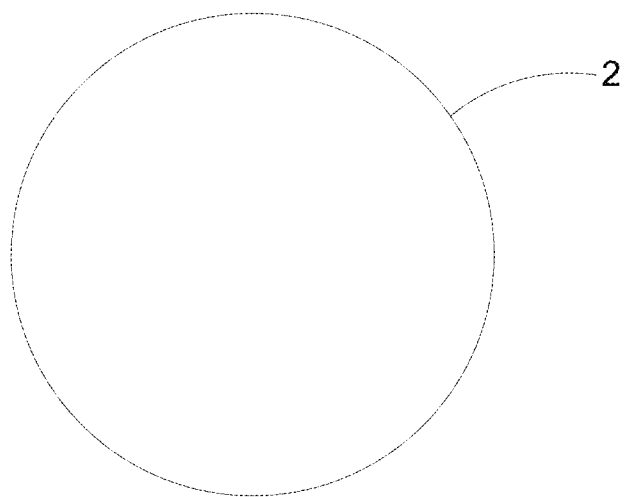
FIGS. 2A through 2H show representative cross-sections of a pressure-containing pipe associated with a pumped storage system with waterfall control system.

The preferred embodiments of FIGS. 1A, 1B and 1C will typically also include measures related to additional objectives in their objective function(s) and constraint(s), such as:
  A measure of cost effectiveness of power provision as needed to match demand;
  Enhanced grid resiliency and stability to meet load needs, leveraging large scale energy storage as intermittent renewable sources become a larger and larger part of the energy source mix;
  Measures of aggressive climate change mitigation targets
  Measure of fulfilment of a goal to never fall short of meeting customer power need or of having blackout or brownout occurrences
  Measure of fulfilment of a goal of minimizing any needs or circumstances requiring dumping of electrical energy to waste heat
  Measure of fulfilment of a goal of never overfilling limited capacity battery banks or other storage subsystems than the pumped storage system with waterfall control subsystem 1 of this invention
  Other measures of objectives known in the art of design and implementation of civil engineering projects FIGS. 2A through 2H show representative cross-sections of a pressure-containing pipe 2 associated with a pumped storage system with a waterfall control subsystem. FIG. 2A shows a pressure-containing pipe 2 with a substantially circular cross-section. It should be understood that various scales are possible within the spirit and scope of the invention as claimed. Nominal diameters in hundreds of feet, e.g. 400 ft., may be beneficial for a Lake Erie/Niagara Region/Lake Ontario pumped storage system with a waterfall control subsystem, that could potentially store on the order of a thousand gigawatt-hours (GW-hr) of energy, plus or minus an order of magnitude, by changing Lake Erie and Lake Ontario surface levels on the order of a few inches to a few feet. As one example, utilizing massive solar power harvesting systems in conjunction with daily pumped storage could enable service to a substantial fraction of North American electric energy needs for base load and typical daily variations. As another example, solar harvesting could be combined with harvesting of wind and/or other renewable energy sources, with different time-variability characteristics than solar. It should be noted from the art of pressurized water transport that a given volumetric flow rate can be achieved with a smaller cross-section pipe, if the water mean velocity is increased. The tradeoff to the benefit of smaller pipe size is greater parasite drag losses due to the greater flow mean velocity.

Figure 2B:
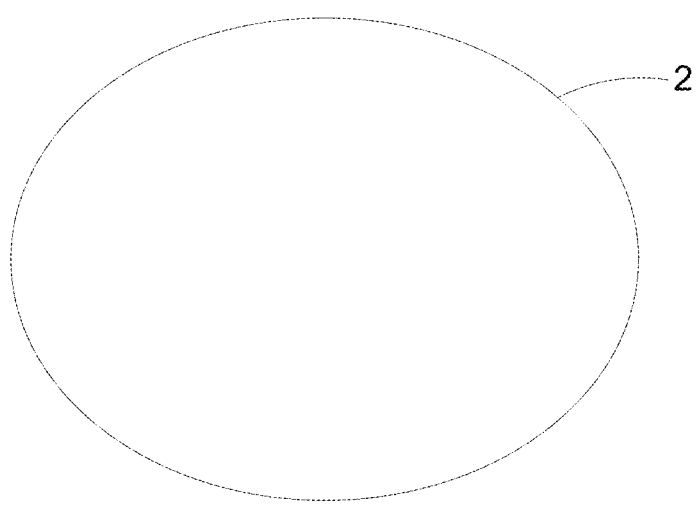
Figure 2C:
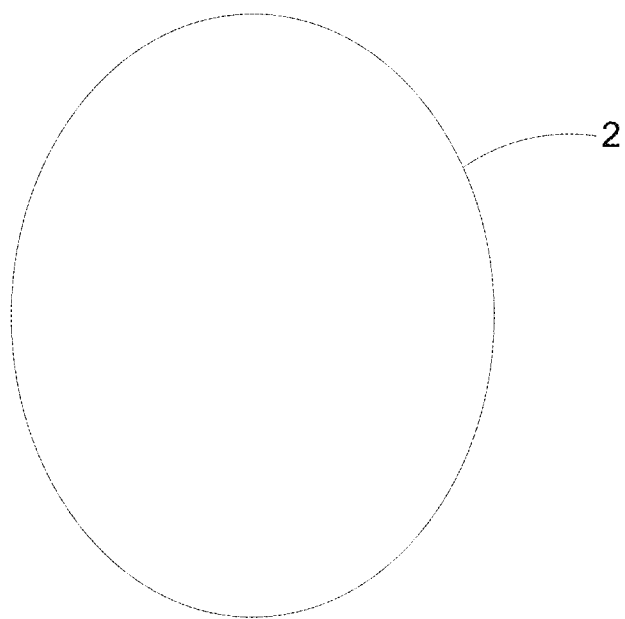
Figure 2D:
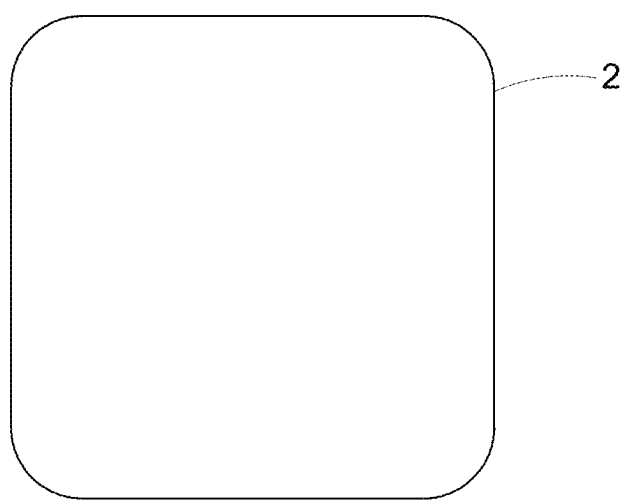
Figure 2E:
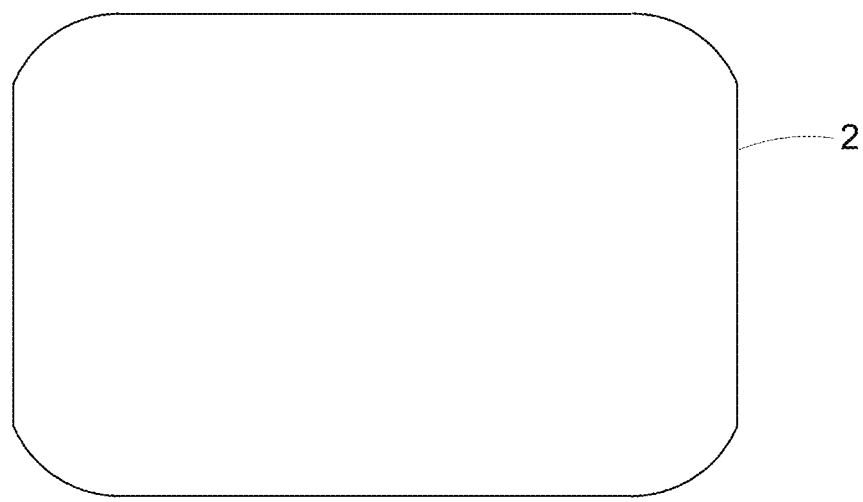
Figure 2F:
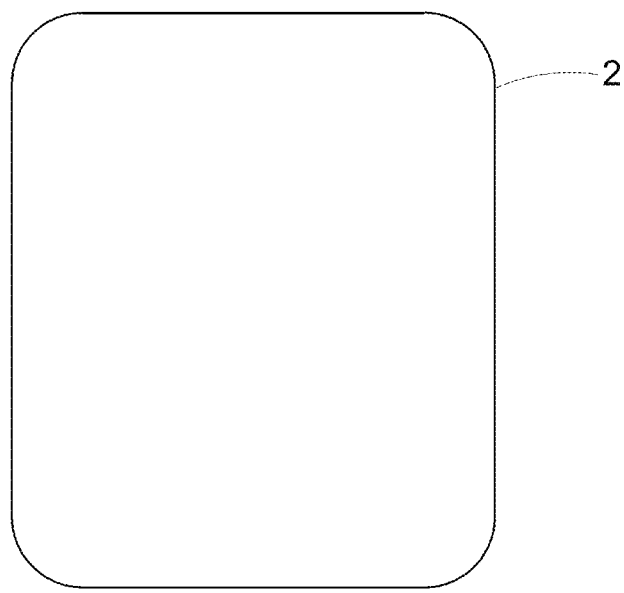
Figure 2G:
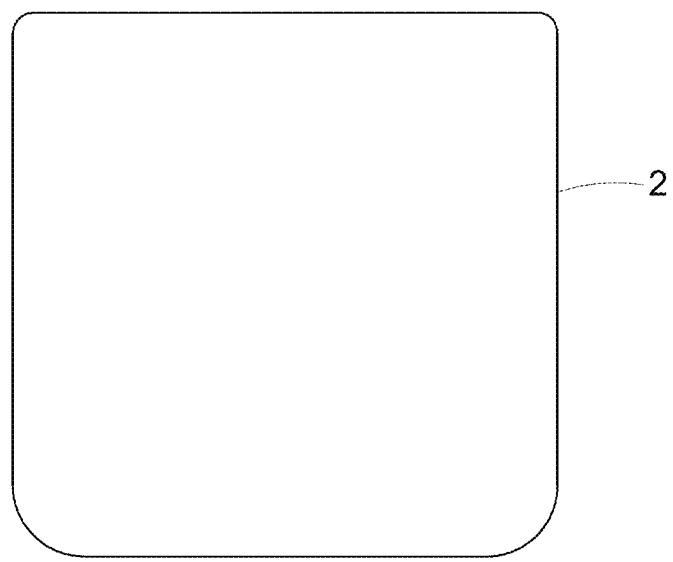

FIG. 2B shows an oval or approximately elliptical cross-section for a pressure-containing pipe 2, wherein the major axis is approximately horizontal. FIG. 2C shows an oval or approximately elliptical cross-section for a pressure-containing pipe 2, wherein the major axis is approximately vertical. Inclined axes embodiments are also possible. FIG. 2D shows an embodiment with an approximately square cross-section with curved corners or fillets, for the pressure-containing pipe 2. FIGS. 2E and 2F show approximately rectangular cross-section pressure-containing pipes 2 that are either wider or narrower than they are tall, also with corner fillets, as illustrated. Alternate embodiments with combinations of fillets and/or chamfers at corners of a polygonal or piecewise edges cross-section are possible within the spirit and scope of the invention as claimed. FIG. 2G shows a quadrilateral cross-section for a pressure-containing pipe 2 with different fillet radii on different corner fillets, and FIG. 2H shows a cross-section for a pressure-containing pipe 2 with curved sides, an approximately flat top and a small approximately flat bottom, as well as fillets at corners.

Figure 2H:
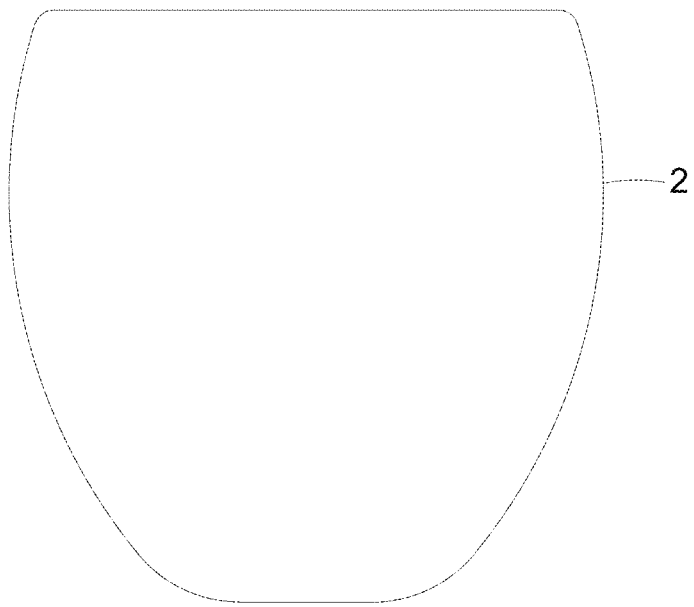

FIG. 2H illustrates a pumped storage system with waterfall control subsystem 1, wherein the cross-section of portions of the pressure-containing pipe 2, comprises a shape with concave inner wetted surfaces of varying radii.

It should be understood that many other cross-sections for the pressure-containing pipe 2 are possible within the spirit and scope of the invention as claimed, including cross-sections with various curved or approximately straight sides, and filleted corners and/or sharp corners. Varying radii may be finitely varying or infinitely varying. In variant preferred embodiments of a pumped storage system with waterfall control subsystem 1, bifurcated or plural pressure-containing pipes 2 may also be used, as well as separated pipes for upward vs downward flow and for pump vs turbine flow. Three dimensional tapered and shaped elements may be incorporated as known in the art, for elements such as a draft tube, a penstock, a surge chamber or a tail race type member. Friction reducing features and pressure gradient management features may also be incorporated from the prior art of pipe flow design, manufacture and management. Portions of pressure-containing pipe 2 may be fully underground, portions may be partially underground, portions may be ground-supported, and/or portions may be fully above ground and/or elevated, as known from prior art of aqueducts, oil and gas pipelines, and other pipe architectures and technologies. Objectives of integrated design of pressure-containing pipes 2 can include able to contain water flow with pressure and without pipe bursting, reduction of construction costs, reduction of overall costs, and reduction of friction and parasitic losses.

FIGS. 3A through 3D show sectional views of embodiments with a pressure-containing pipe beneath a surface corridor suitable for supporting a vehicle thereupon.

Figure 3A:
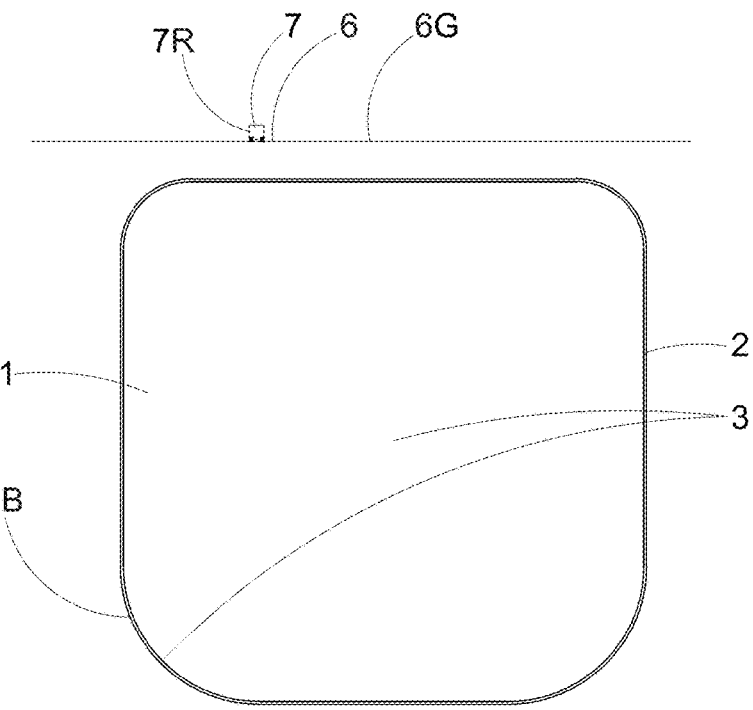
FIGS. 3A through 3D show sectional views of embodiments with a pressure-containing pipe beneath a surface corridor suitable for supporting a vehicle thereupon.

FIG. 3A shows a pressure-containing pipe 2 comprising a pressure-containing water connection path 3 for transporting water 11 under pressure, and an additional pressure containment envelope 3B. The additional pressure containment envelope may be either an additional rigid envelope to provide a secondary pressure containment boundary, or optionally a membrane or reinforced membrane boundary with sufficiently high tensile strength and tear-resistance. The pressure-containing pipe 2 is installed in an excavation beneath a ground surface 6G with a surface corridor 6 suitable for supporting a vehicle 7 comprising ground vehicle such as a road vehicle 7R thereupon. In variant embodiments the surface corridor 6 may be substantially aligned with, angled relative to, or substantially perpendicular or normal to the local azimuthal alignment of the pressure-containing pipe 2.

FIG. 3A thus illustrates a pumped storage system with waterfall control subsystem 1, wherein the surface corridor 6 comprises a ground surface corridor including at least a portion suitable for supporting a ground vehicle thereon. The ground vehicle could be a car, automobile, van, recreational vehicle, ambulance, motorcycle, scooter, three-wheeler, bus, truck, tractor-trailer vehicle, tractor or other ground vehicle, without limitation. For example and without limitation, if the pressure-containing pipe 2 has a cross-section as illustrated, with horizontal and vertical dimensions approximately 110 meters, it could accommodate sufficient flow at approximately 9 meters per second (to limit friction or parasite drag losses) to store gravitational potential energy in pumped water of a pumped storage system connecting Lake Ontario to Lake Erie (with an elevation difference of approximately 99 meters), sufficient to store 100 gigawatts over 12 hours (such as daylight hours with power from solar powerplants), then generate 100 gigawatts over 12 hours (such as night-time hours).

Figure 3B:
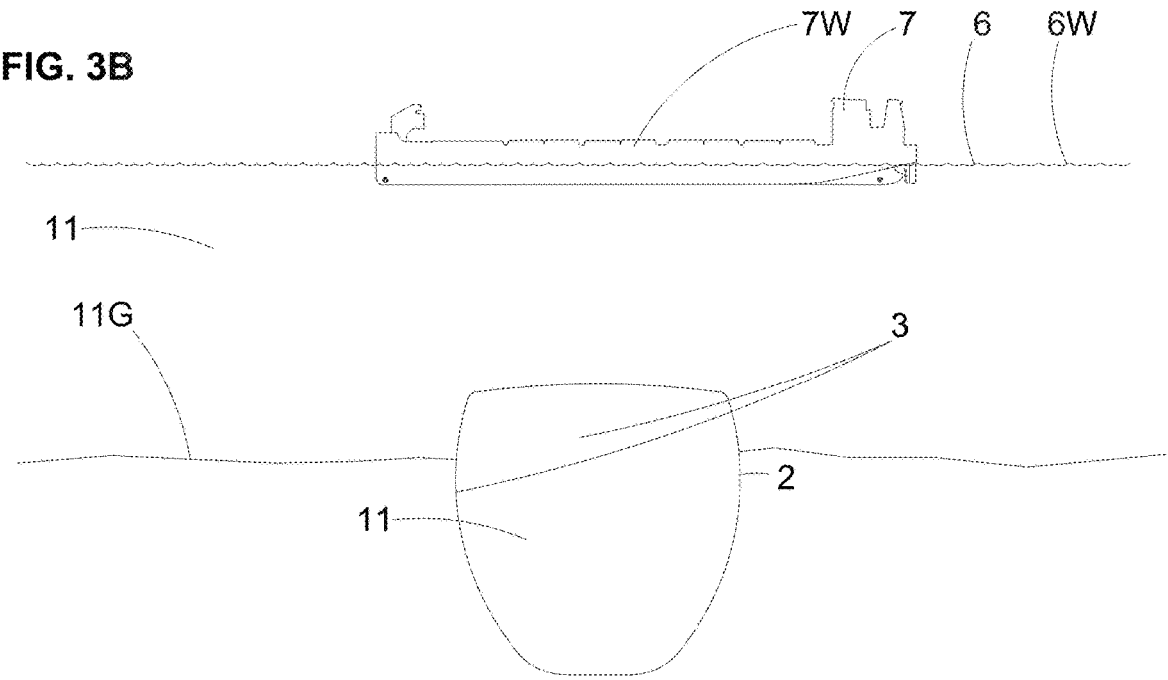

FIG. 3B shows a pressure-containing pipe 2 comprising a pressure-containing water connection path 3 for transporting water 11 under pressure, located underwater beneath a body of water such as a lake, reservoir, river, canal or other water body with a water surface 6W. The pressure-containing pipe 2 is installed supported by an underwater ground surface 11G as illustrated, and may optionally be partially or fully buried in said underwater ground surface with appropriate excavations used in the construction and installation process. FIG. 3B further illustrates a surface corridor 6 on the water surface 6W suitable for supporting a vehicle 7 comprising a water vehicle 7W thereupon. The illustrated water vehicle 7W is a representative Great Lakes ship, however it should be understood that a wide variety of water vehicles including boats, barges and other types of watercraft could be alternatively supported on the water surface 6W in the surface corridor 6. The surface corridor 6 may optionally constitute the entire navigable portion of the water surface 6W including lake, river, canal and other portions.

Figure 3C:
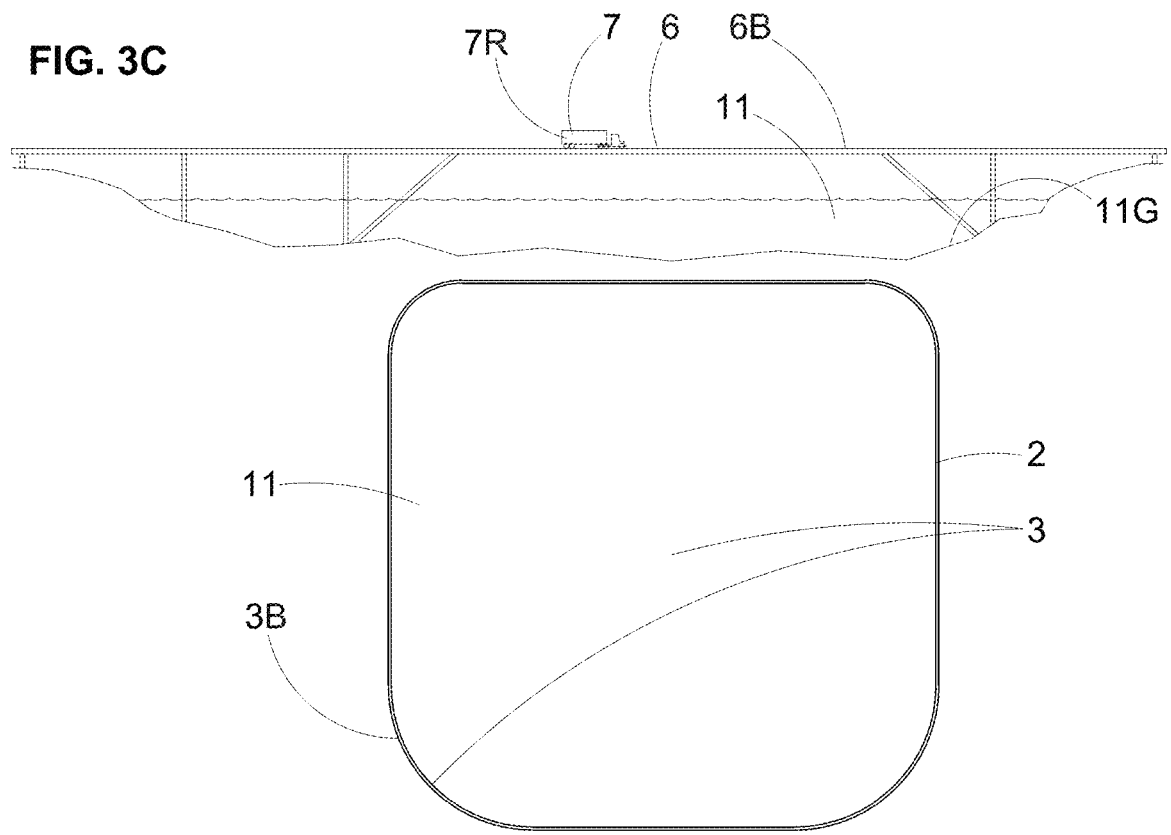

FIG. 3C shows a pressure-containing pipe 2 comprising a pressure-containing water connection path 3 for transporting water 11 under pressure along with an optional additional pressure containment envelope 3B, and with the pressure-containing pipe 2 located below an underwater ground surface 11G of a river or canal or other water body with a bridge surface 6B above serving as a surface corridor 6 suitable for supporting a vehicle 7 comprising a road vehicle 7R supported on a roadway on the surface corridor 6.

Figure 3D:
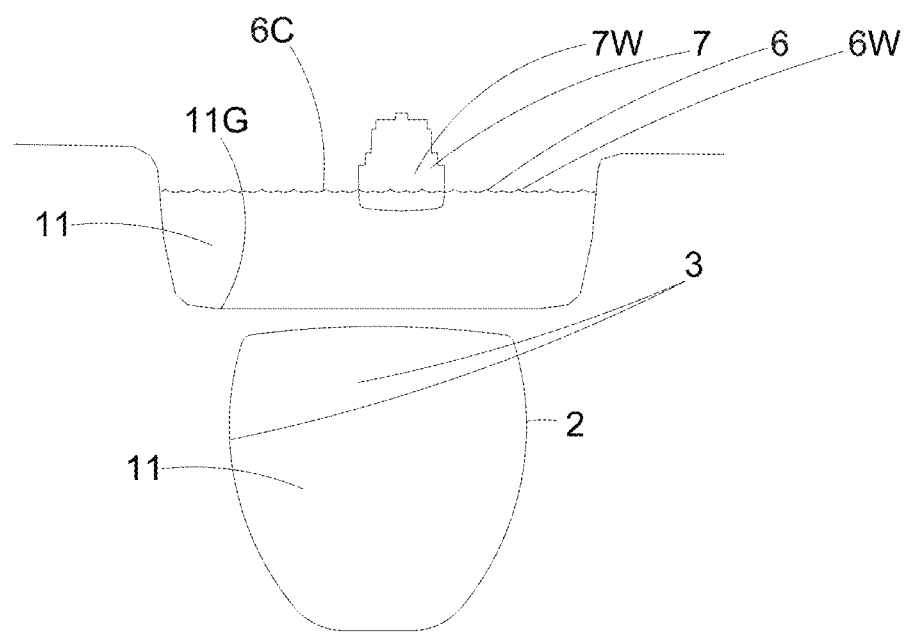

FIG. 3D shows a pressure-containing pipe 2 comprising a pressure-containing water connection path 3 for transporting water 11 under pressure, located underwater beneath a body of water such as a canal 6C (or in variant embodiments a navigable portion of a river or channel or waterway) with a water surface 6W. The pressure-containing pipe 2 is installed below an underwater ground surface 11G as illustrated, with appropriate excavations used as needed in the construction and installation process. FIG. 3D further illustrates a surface corridor 6 on the water surface 6W suitable for supporting a vehicle 7 comprising a water vehicle 7W thereupon. The illustrated water vehicle 7W is a representative Great Lakes ship, however it should be understood that a wide variety of water vehicles including boats, barges and other types of watercraft could be alternatively supported on the water surface 6W in the surface corridor 6.

FIG. 3D thus illustrates a pumped storage system with waterfall control subsystem 1, wherein the surface corridor 6 comprises a waterway (shown here with a water surface 6W) capable of supporting a marine vehicle thereon. A marine vehicle could comprise a boat, motorboat, yacht, ship, vessel, barge, submarine, hydrofoil or hovercraft, without limitation.

Figure 4A:
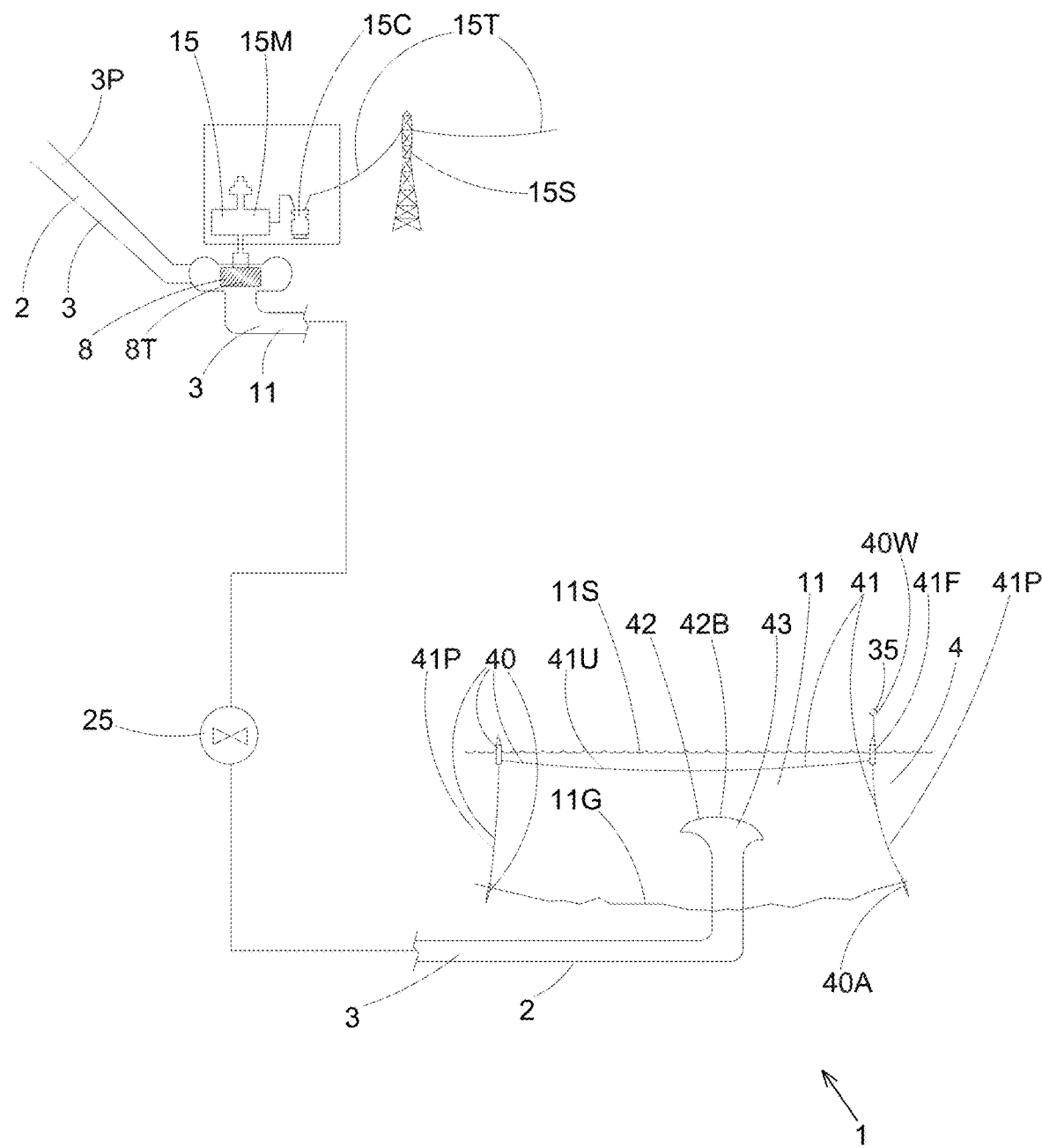
FIGS. 4A and 4B diagram embodiments including water inlet/outlet features, safety features and controllable valve features.
Figure 4B:
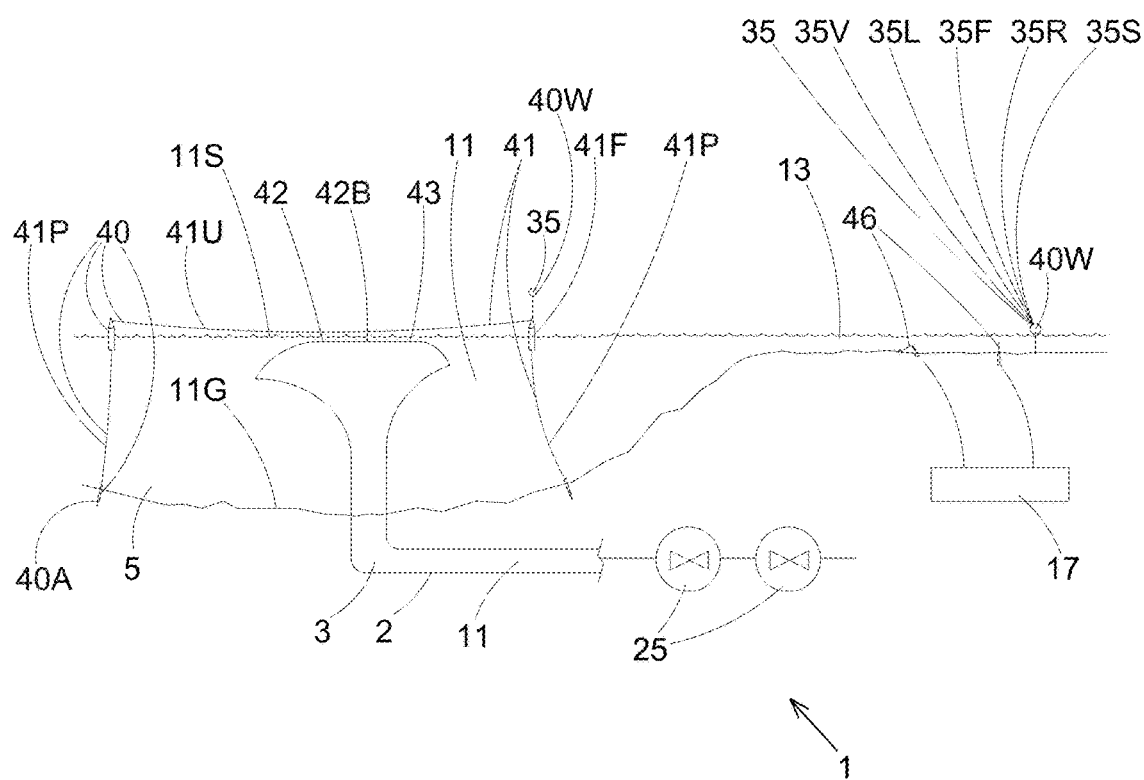

FIGS. 4A and 4B diagram embodiments including water inlet/outlet features, pressure-containing pipe, safety features and controllable valve features.

FIG. 4A shows a diagram of a portion of a pumped storage system with waterfall control subsystem 1, showing a pressure-containing pipe 2 comprising a pressure-containing water connection path 3 for transporting water through a penstock 3P to a turbine 8T that is optionally a pump turbine 8 in one variant embodiment, and thence through a controllable valve 25 and additional pressure-containing pipe 2 and pressure-containing water connection path 3 to a water outlet 43 that is also optionally a water inlet 42 that is a bellmouth water inlet 42B, located in the lower elevation water body 4. The pump turbine 8 may comprise a pump hydro turbine subsystem as known in the prior art. The water flows in the sense described above during a generating time window, and in this generating mode the turbine 8T drives a generator 15 that is optionally a motor generator 15M. The generator 15 sends electrical power through an electrical power conditioning subsystem 15C and electrical power transmission subsystem 15T to an electric power grid/smart grid that provides electrical power to grid-tied consumers or customers of electrical power. Note that the electrical power conditioning subsystem 15C may include one or more of transformer, voltage converter, rectifier, inverter, and other electrical power conditioning equipment. Note that electrical power transmission subsystem 15T may include one or more of cable, wire, superconducting cable, elevated cable, underground cable, underwater cable, double, triple or multiple insulated cable, DC or AC transmission lines, and other electrical power transmission equipment. Where overhead transmission lines are used, a support subsystem 15S such as a support tower for the electrical power transmission subsystem 15T may be provided. For the optional embodiment where the turbine 8T is also a pump turbine 8, during a pumping time window, the water flow is reversed, with water coming into the pressure-containing pipe 2 and pressure-containing water connection path 3 from the lower elevation water body 4, through the water inlet 42 that is a bellmouth water inlet 42B. The bellmouth water inlet 42B may be asymmetrically shaped in a tailored way (e.g., petaled shape or other symmetric or asymmetric shapes) such that the large incoming volumetric flows of water do not cause undesired erosion or environmental or ecological effects to the lower elevation water body 4 including lakebed and shoreline and water surface flow induced effects. The bellmouth water inlet 42B is shown supported on an underwater tower that encircles the inlet water flow path. The tower may utilize any of many known structural constructs known in the prior art, including rigid cylindrical structure, double or multiple wall structure, sandwich structure, stiffened skin structure, truss structure, isogrid or orthogrid structure, and/or other structural architectures. The pump turbine 8 operates now in a pump mode, and takes water sourced from the lower elevation water body 4 that flows through the controllable valve 25 and is thence pumped by the pump turbine 8 upwards through the part of the pressure-containing pipe 2 designated as the penstock 3P, and eventually up to the upper elevation water body 5 (not shown in this illustration). Power comes into the pump turbine 8 from the electrical power conditioning subsystem 15C and electrical power transmission subsystem 15T, with origins either in the grid/smart grid or directly from a power generation subsystem that might be a renewable energy power harvesting subsystem or other power generation subsystem. Variant embodiments may use multiple pressure-containing pipes 2 and pressure-containing water connection paths 3 and multiple valves, along with path management and control and failure reconfiguration subsystems. As alternatives to bellmouth inlets, any of a large number of inlet types and specific designs are possible as known in the substantial prior art of inlets. In a similar manner, any of a large number of outlet types and specific designs are possible as known in the prior art, including cases where inlet and outlet are integrated or not integrated. Multiple inlets, outlets and combined inlet/outlet combinations can be used in varying numbers and arrangements in variant embodiments of the invention as claimed.

FIG. 4A also illustrates aspects of a safety subsystem 40, here including a perimeter safety sheet 41P that is supported by floats 41F on the water surface 11S and anchored to the underwater ground surface 11G by an anchor subsystem 40A. The floats 41F also serve as perimeter supports for an optional upper safety sheet 41U. The illustrated perimeter safety sheet 41P and upper safety sheet 41U are, in one preferred embodiment, perforated safety sheet 41. The perforated safety sheet 41 can be flexible or rigid sheet, of panel structure, of fabric or reinforced fabric structure, of mesh structure, of net structure, and/or of screen structure, and further optionally be fitted with attachment fittings such as eyelets or fastener fittings. The illustrated perimeter safety sheet 41P and upper safety sheet 41U will preferably allow water to flow through, but will prevent passage of a human being such as a swimmer or windsurfer or kiteboarder or boater or iceboater or parasailer, and also prevent passage of land or marine animals larger than some minimum small size that might expose such to risk of injury or death. In one embodiment the holes to allow water passage may be around ¼ inch in diameter, without limitation. Biofouling prevention features and/or invasive species migration prevention features may be incorporated as known in the prior art, for this and other subsystems and components. For the purpose of explanation, one example of use of a perforated safety sheet 41 might serve to inhibit or prevent migration of invasive species from Lake Ontario to Lake Erie, for species that are not normally native to the Upper Great Lakes these being Erie, Huron, Michigan and Superior. Note that in variant preferred embodiments the upper safety sheet 41U may be substantially below the water surface (as illustrated), substantially at the water surface level, or substantially above the water surface level. If at the water surface level, the upper safety sheet 41U will necessarily incorporate features to enable it to not be damaged when surface ice forms on the surface of the water in winter conditions, as applicable.

FIG. 4A therefore shows a pumped storage system with waterfall control subsystem 1, further comprising a safety subsystem 40 for reducing safety risks to more than one of: humans, marine animals, land animals, amphibians, birds, bats, insects and plants. Note that the safety subsystem 40 may further comprise one or more of: fences, warning systems connected to detection systems, filter and screen systems, warning buoys, lights, fluorescent reflectors, multiple valves, computerized systems including Failure Modes and Effects Analysis (FMEA), fault tree, redundancy & redundancy management, failure detection, isolation & correction subsystems and other safety and warning subsystems know in the prior art, without limitation.

FIG. 4A also illustrates sensor means 35, that can include plural sensors comprising one or more of a camera 35V, a water level sensor 35L, a water flow rate sensor 35F, a shoreline sensor 35S, and another sensor. The sensor means 35 may be hydrostatically (e.g., float or buoy) supported as illustrated, or alternatively or additionally may be partially aerostatically or aerodynamically supported. The sensor means 35 may incorporate an integrated warning subsystem and/or rescue subsystem, wherein the warning subsystem may comprise a detection subsystem, a computer subsystem, an artificial intelligence subsystem, an expert subsystem, an aural warning subsystem (e.g. using loudspeakers and/or a siren and/or a spoken/shouted warning subsystem), a visual warning subsystem (e.g. using lighthouse-type or strobe-type lights), and/or a warning transmission subsystem (e.g., by radio transmission). Appropriate warning subsystems known in the prior art for warning swimmers, watercraft, boats, submarines, aircraft, humans, land animals and life forms, and water animals and life forms, are included as types of warning subsystems that can be included in different preferred embodiments of this invention. A rescue subsystem if provided may command deployment of lifevests, floats, inflatables, rafts, or autonomous rescue boats or aircraft to assist any humans or animals who might need help or rescue.

FIG. 4A also shows a pumped storage system with waterfall control subsystem 1, wherein the control system means 1CS further serves as control means for generating and transmitting valve control commands to at least one controllable valve 25 in said pressure-containing pipe 2.

FIG. 4A also shows a pumped storage system with waterfall control subsystem 1, wherein the controllable valve 25 comprises at least one of (i) a safety shutoff valve for preventing flow in in said pressure-containing pipe following a failure event that necessitates flow stoppage; (ii) a valve for controlling direction of flow in said pressure-containing pipe; (iii) a bypass valve; (iv) a bifurcation control valve; (v) a check valve; (vi) a rate-limiting valve; (vii) a pump flow control valve; and (viii) a turbine flow control valve. In variant preferred embodiments different numbers, types and locations of valves and other components, along with fault identification, redundancy management and reconfiguration subsystems, may optionally be used to enhance reliability of operation and safety assurance following failure, fault and/or natural or human-caused damage or destruction of portions of the system (e.g. by earthquake, tsunami, storms of various types, terrorism and other various causes).

In a variant preferred embodiment of the type shown in FIG. 4A wherein the water of the lower elevation water body 4 is salt water such as sea water, but the water of the upper elevation water body is fresh water, it is possible that the perforated safety sheet 41 can be further fitted with a semipermeable membrane at locations where water can go through the membrane, but salt cannot, in which case the water in the entire feed volume that feeds into the water inlet 42 is fresh water rather than salt water, so as not to contaminate the upper elevation water body with salt water. An example previously cited that would fall in this category is the case of a potential pumped storage systems between Geiranger Fjord (lower elevation water body, a salt water arm of the ocean) and Lake Skagedalsvatnet (upper elevation water body comprising fresh water) connected by a Geitelva stream and the Brudesloret waterfalls in Norway.

FIG. 4B illustrates water inlet/outlet features, pressure-containing pipe, safety features and controllable valve features of a preferred embodiment of the invention in the region of the upper elevation water body 5 (e.g., Lake Erie in one example). The features illustrated in FIG. 4B are complementary and compatible with the features shown earlier in FIG. 4A. The water inlet 42 that is a bellmouth water inlet 42B (and also water outlet 43) may be asymmetrically shaped in a tailored way (e.g., petaled shape or other symmetric or asymmetric shapes) such that the large incoming or outflowing volumetric flows of water do not cause undesired erosion or environmental or ecological effects to the upper elevation water body 5 including lakebed and shoreline and water surface flow induced effects. The bellmouth water inlet 42B is shown supported on an underwater tower that encircles the inlet water flow path, and may also be supported by floats at or near the perimeter of the bellmouth water inlet 42B. The tower may utilize any of many known structural constructs known in the prior art, including rigid cylindrical structure, double or multiple wall structure, sandwich structure, stiffened skin structure, truss structure, isogrid or orthogrid structure, and/or other structural architectures. Variant embodiments may use multiple pressure-containing pipes 2 and pressure-containing water connection paths 3 and multiple valves, along with path management and control and failure reconfiguration subsystems. As alternatives to bellmouth inlets, any of a large number of inlet types and specific designs are possible as known in the substantial prior art of inlets. In a similar manner, any of a large number of outlet types and specific designs are possible as known in the prior art, including cases where inlet and outlet are integrated or not integrated. Multiple inlets, outlets and combined inlet/outlet combinations can be used in varying numbers and arrangements in variant embodiments of the invention as claimed.

FIG. 4B shows a pumped storage system with waterfall control subsystem 1, further comprising a safety subsystem 40 for reducing safety risks to more than one of: humans, marine animals, land animals, amphibians, birds, bats, insects and plants. FIG. 4B also illustrates aspects of a safety subsystem 40, here including a perimeter safety sheet 41P that is supported by floats 41F on the water surface 11S and anchored to the underwater ground surface 11G by an anchor subsystem 40A. The floats 41F also serve as perimeter supports for an optional upper safety sheet 41U. The illustrated perimeter safety sheet 41P and upper safety sheet 41U are, in one preferred embodiment, perforated safety sheet 41. The perforated safety sheet 41 can be flexible or rigid sheet, of panel structure, of fabric or reinforced fabric structure, of mesh structure, of net structure, and/or of screen structure, and further optionally be fitted with attachment fittings such as eyelets or fastener fittings. The illustrated perimeter safety sheet 41P and upper safety sheet 41U will preferably allow water to flow through, but will prevent passage of a human being such as a swimmer or windsurfer or kiteboarder or boater or iceboater or parasailer, and also prevent passage of land or marine animals larger than some minimum small size that might expose such to risk of injury or death. In one embodiment the holes to allow water passage may be around ¼ inch in diameter, without limitation. Biofouling prevention features and/or invasive species migration prevention features may be incorporated as known in the prior art, for this and other subsystems and components. Note that in variant preferred embodiments the upper safety sheet 41U may be substantially above the water surface (as illustrated), substantially at the water surface level, or substantially below the water surface level. If at the water surface level, the upper safety sheet 41U will necessarily incorporate features to enable it to not be damaged when surface ice forms on the surface of the water in winter conditions, as applicable. Note that the safety subsystem 40 may further comprise one or more of: fences, warning systems connected to detection systems, filter and screen systems, warning buoys, lights, fluorescent reflectors, multiple valves, computerized systems including Failure Modes and Effects Analysis (FMEA), fault tree, redundancy & redundancy management, failure detection, isolation & correction subsystems and other safety and warning subsystems know in the prior art, without limitation.

FIG. 4B also illustrates sensor means 35 shown near both the inlet/outlet region of the upper elevation water body 5 and in or near a river 13, that can include plural sensors comprising one or more of a camera 35V, a water level sensor 35L, a water flow rate sensor 35F, a river sensor 35R, a shoreline sensor 35S, and another sensor. The sensor means 35 may be hydrostatically (e.g., float or buoy) supported, post supported from a ground or underwater ground surface, or alternatively or additionally may be partially aerostatically or aerodynamically supported. The sensor means 35 may incorporate a connected and/or integrated warning subsystem 40W and and/or rescue subsystem, which warning subsystem 40W may comprise a detection subsystem, a computer subsystem, an artificial intelligence subsystem, an expert subsystem, an aural warning subsystem (e.g. using loudspeakers and/or a siren and/or a spoken/shouted warning subsystem), a visual warning subsystem (e.g. using lighthouse-type or strobe-type lights), and/or a warning transmission subsystem (e.g., by radio transmission). Appropriate warning subsystems known in the prior art for warning swimmers, watercraft, boats, submarines, aircraft, humans, land animals and life forms, and water animals and life forms, are included as types of warning subsystems that can be included in different preferred embodiments of this invention. A rescue subsystem if provided may command deployment of lifevests, floats, inflatables, rafts, or autonomous rescue boats or aircraft to assist any humans or animals who might need help or rescue.

FIG. 4B illustrates a pumped storage system with waterfall control subsystem 1, wherein the multiobjective control subsystem 17 further includes a controllable water deflection subsystem 46 upstream of said waterfall, wherein control through actuation of said water deflection subsystem 46 impacts at least one of water velocity direction, water velocity magnitude, water kinetic energy, water flow rate, waterfall visual appearance, waterfall stream pattern, waterfall spray pattern, waterfall mist pattern, and waterfall sound. The multiobjective control subsystem 17 may utilize inputs from sensor means 35 as well as operator inputs and inputs on current and/or past and/or forecast future wind, temperature, precipitation, light conditions, water surface conditions, ice conditions and other inputs, and may utilize one or more of a computer, a machine learning subsystem, an artificial intelligence subsystem, an expert subsystem. The multiobjective control subsystem 17 may utilize inputs from sensor means 35 as well as operator inputs and inputs on current and/or past and/or forecast future wind, temperature, precipitation, light conditions, water surface conditions, ice conditions and other inputs, and may utilize one or more of a computer, a machine learning subsystem, an artificial intelligence subsystem, an expert subsystem. The water deflection subsystem 46 may comprise one or more of: deployable barriers (e.g. by translation and/or rotation and/or roll-out means and/or shape-changing means, without limitation), deployable sluices, deployable weirs, deployable gates, deployable dams, deployable flow diverters, deployable vanes, deployable vortex generators, deployable control surfaces, deployable rakes, deployable strainers, deployable meshes, deployable nozzles, fish-transit-permitting, fish-transit-inhibiting and/or other deployable or actuation-operable devices known in the art, in addition to non-deployable or fixed members known in the art. The water deflection subsystem 46 may serve as means to prevent excessive water velocity fields and/or excessive water flow rates in all or part of the river 13, for example in the case where the pumped storage system with waterfall control subsystem 1 has pumped the water level in the upper elevation water body 5 to above-normal levels. It will be understood from the prior art established science of water flow continuity that preventing excessive water flow rate by reducing water flow rate in the river 13 downstream of the upper elevation water body 5 and upstream of the waterfall 14 will correspondingly reduce the rate of water level lowering in the upper elevation water body 5 that is associated with the outflow to the river 13 and waterfall 14, and will also correspondingly reduce the water flow rate over the waterfall 14. The water deflection subsystem 46 may alter flow patterns to different waterfalls or waterfall regions or segments for visual appeal and/or erosion limiting and/or flow management and/or other purposes, as for example altering flows to the Horseshoe Falls and/or the American Falls or portions thereof respectively at Niagara Falls. The water deflection subsystem 46 may contribute to enabling the multiobjective control subsystem 17 to optimally achieve objectives and balance achievement of objectives related to energy and power, ecological objectives, environmental objectives, safety objectives, erosion objectives (e.g., bed erosion, shore erosion and other erosion), harm minimization objectives and touristic and visual appeal objectives, as well as other objectives. The water deflection subsystem 46 and associated and ancillary subsystems may also include features to minimize hazards or threats to humans, land & water & amphibious living beings.

FIG. 4B also shows a pumped storage system with waterfall control subsystem 1, wherein the control system means 1CS further serves as control means for generating and transmitting valve control commands to at least one controllable valve 25 (two shown in the illustrated embodiment, without limitation) in said pressure-containing pipe 2. The pressure-containing pipe 2 is illustrated in a subsurface or underground configuration, but in variant embodiments parts of it could be at or above a ground surface or underwater ground surface or a water surface. Portions of the flowpath could also be in surface channels which are not pipes, within the spirit and scope of the invention as claimed.

FIG. 4B also shows a pumped storage system with waterfall control subsystem 1, wherein the controllable valve 25 comprises at least one of (i) a safety shutoff valve for preventing flow in in said pressure-containing pipe following a failure event that necessitates flow stoppage; (ii) a valve for controlling direction of flow in said pressure-containing pipe; (iii) a bypass valve; (iv) a bifurcation control valve; (v) a check valve; (vi) a rate-limiting valve; (vii) a pump flow control valve; and (viii) a turbine flow control valve. In variant preferred embodiments different numbers, types and locations of valves and other components, along with fault identification, redundancy management and reconfiguration subsystems, may optionally be used to enhance reliability of operation and safety assurance following failure, fault and/or natural or human-caused damage or destruction of portions of the system (e.g. by earthquake, tsunami, storms of various types, terrorism and other various causes). As an added measure of safety in the most improbable event of terrorism or sabotage of all valves, the illustrated embodiment in FIG. 4B shows the water inlet 42 located in relative proximity to the water surface 11S, so that even in this scenario a disaster where most or all of the upper elevation water body 5 disastrously and rapidly drains into the lower elevation water body. For example and without limitation, the water inlet 42 may be located between 2 inches and 200 inches of a nominal lower water level line or the water surface 11S. In lieu of the vertically oriented inlet axis, angled orientation or horizontal orientation inlet axis orientations can be used in alternative preferred embodiments.

Figure 5A:
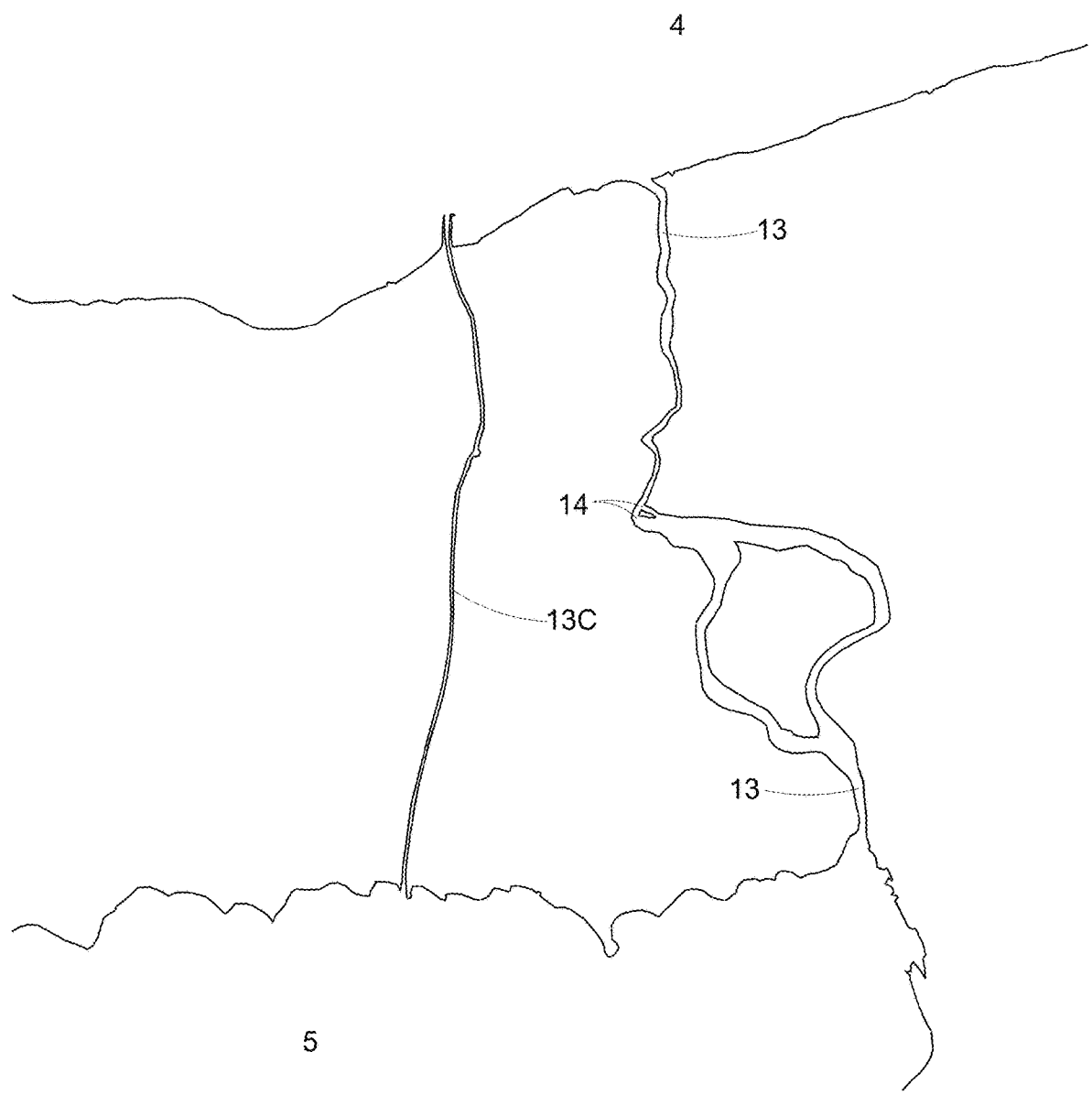
FIG. 5A shows a representative siting map that includes portions of the State of New York in the U.S.A. and the Province of Ontario in Canada, with Lake Erie connected via the Niagara River and Niagara Falls to Lake Ontario.

FIG. 5A shows a representative siting map that includes portions of New York State in the U.S.A. and Ontario in Canada, with Lake Erie connected via the Niagara River and Niagara Falls to Lake Ontario, illustrating an excellent representative example of a siting location suitable for implementation of a pumped storage system with waterfall control subsystem. In this map view of a siting location, a waterfall 14 that is Niagara Falls is shown, and a candidate pumped storage system could pump water from Lake Ontario as a lower elevation water body 4, to Lake Erie as an upper elevation water body 5. In this geographical instance, the lower elevation water body 4 and upper elevation water body 5 are also connected by a canal 13C, here illustrated to be the Welland Canal, with locks to enable boats or ships or other marine vehicles to traverse between the lower elevation water body 4 and the upper elevation water body 5. It should be understood in the subsequent detailed description of certain preferred embodiments of the invention as illustrated and described with respect to implementation at this representative site, that the invention as claimed is not solely limited to this single Great Lakes region site notwithstanding that implementation at this site holds the greatest pumped storage energy storage potential of any site in the World.

FIGS. 5B through 5F show various exemplary preferred embodiment installations of pressure-containing pipe connecting a lower elevation water body 4 and an upper elevation water body 5 to enable a pumped storage system with waterfall control subsystem 1.

Figure 5B:
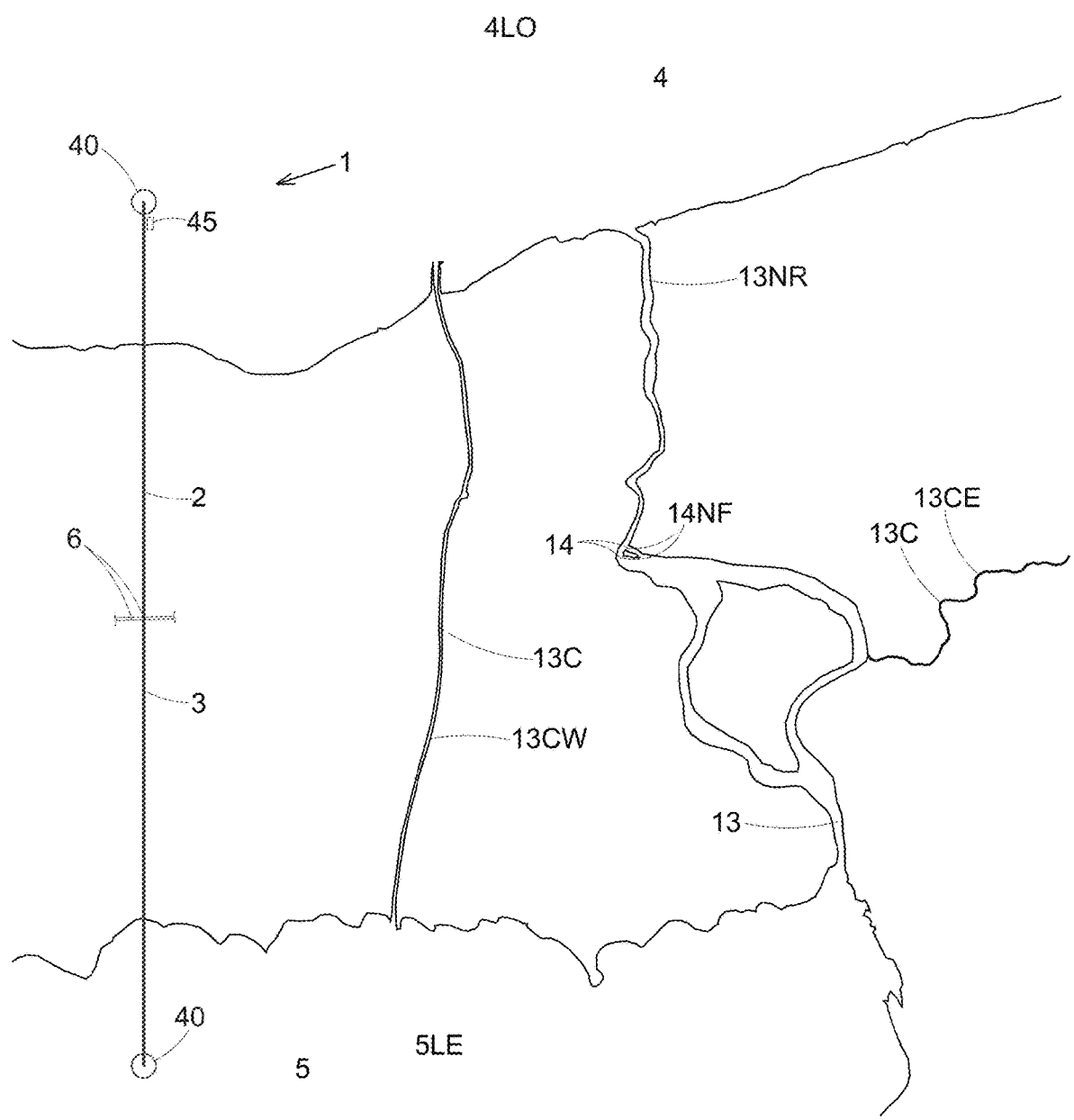
FIGS. 5B through 5G show various exemplary preferred embodiment installations of pressure-containing pipe connecting a lower elevation water body and an upper elevation water body to enable a pumped storage system with waterfall control subsystem.

FIG. 5B shows the same site as in FIG. 5A. As illustrated, a waterfall 14 that is Niagara Falls 14NF is shown in the course of a river 13 that is the Niagara River 13NR that carries a natural gravity-driven flow of water from Lake Erie 5LE to Lake Ontario 4LO, along with a pumped storage system with waterfall control subsystem 1 that can pump water from Lake Ontario 4LO as a lower elevation water body 4, to Lake Erie 5LE as an upper elevation water body 5. FIG. 5B shows a second illustrated canal 13C as well, this being the Erie Canal 13CE which connects Lake Erie to the Hudson River and thence to the Atlantic Ocean at New York City, in addition to the first illustrated canal 13C that is the Welland Canal 13CW connecting Lake Erie with Lake Ontario to permit navigation of water vessels such as Great Lakes ships therebetween, via a series of operable locks as known in the art of canal design, implementation and operation.

In the embodiment of FIG. 5B, a pumped storage system (with waterfall control subsystem) 1 is shown implemented with a pressure-containing pipe 2 that connects the lower elevation water body 4 being Lake Ontario, with the upper elevation water body 5 being Lake Erie. The pressure-containing pipe 2 serves as a pressure-containing water connection path 3. The pressure-containing pipe 2 traverses in part under a surface corridor 6 that carries an east to west road, Ontario Highway 20 shown without limitation. Without limitation, the pressure-containing pipe may have a width of 360 feet and be constructed more than a meter below the surface of the surface corridor. The embodiment of FIG. 5B also illustrates implementation of elements of a safety subsystem 40 here comprising a large floating ring fence for preventing boats from entering areas associated with inlet/outlet regions of said pressure-containing pipe, and said representative floating ring also having mesh hanging down to bottom ends anchored into the underwater surface, wherein the approximately cylindrical shaped mesh surface serves to prevent large fish or animals or submarines from entry into said areas associated with inlet/outlet regions of said pressure-containing pipe.

FIG. 5B thus illustrates a pumped storage system with waterfall control subsystem 1, further comprising a safety subsystem 40 for reducing safety risks to more than one of: humans, marine animals, land animals, amphibians, birds, bats, insects and plants.

FIG. 5B further illustrates a barge 45 floating in a tethered position near the lower elevation water body 4 (Lake Ontario) terminus of the pressure-containing pipe 2. Barge 45 can contain power conditioning and transmission equipment that connects the electric grid in Canada and/or the U.S.A. to pump and generator subsystems of the pumped storage system with waterfall control subsystem 1, utilizing some combination of transmission lines at various levels relative to ground and water surfaces, e.g. underwater cable, underground cable, surface cable and above-surface cable lines. High voltage, ultra-high voltage, AC, DC, superconducting cable, multiple insulated cable, and other technologies known in the art of electric power transmission may be selected and employed as beneficial. The barge may also include hydrogen storage subsystem elements such as electrolysis elements, hydrogen storage elements in gaseous or liquid/cryogenic or metal hydride forms, hydrogen loading onto Great Lakes vessels for trans-shipment to more distant destinations. The barge may also include other energy storage subsystems such as battery bank elements, chemical storage elements, thermal storage elements, flywheel or kinetic energy storage elements, and other energy storage elements. The barge may also include a rapid-response and/or peaking power generation subsystem such as a gaseous fuel powered subsystem, to provide quick response power responsive to power demand upward spikes or renewable power downward spikes (e.g., for cloud-obstruction causing a downward spike in solar power feeding into an electric grid or smart grid). The barge may also include maintenance facilities and equipment, quarters for operations, maintenance and repair personnel, vessel docking facilities (e.g. barge, ship, hydrogen carrying ship, icebreaker, yacht, boat etc) and a helipad and/or airstrip.

Figure 5C:
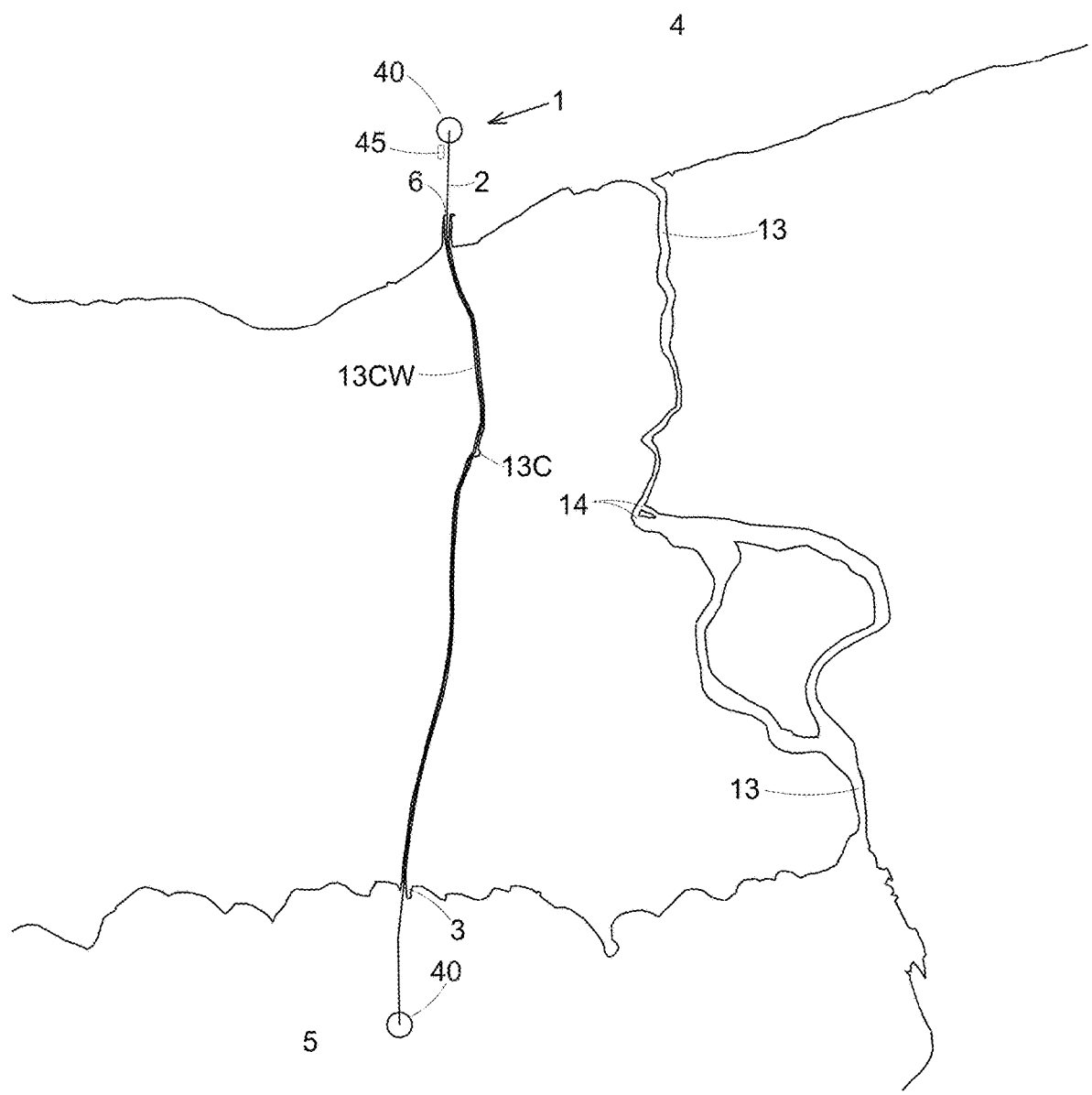

In the embodiment of FIG. 5C, a pumped storage system (with waterfall control subsystem) 1 is shown implemented with a pressure-containing pipe 2 that connects the lower elevation water body 4 being Lake Ontario, with the upper elevation water body 5 being Lake Erie. The pressure-containing pipe 2 serves as a pressure-containing water connection path 3. The pressure-containing pipe 2 traverses in part under a surface corridor 6 that to considerable extent follows the course of a canal 13C, the Welland Canal shown without limitation. The course of the pressure-containing pipe 2 must be designed nonconflicting with bridges or tunnels crossing the Welland Canal, possibly with some relocation of said bridges and tunnels where needed or beneficial. Without limitation, the pressure-containing pipe may have a width of 180 feet and be constructed just below the surface of the underwater surface of the canal 13C, wherein the surface corridor 6 comprises to considerable extent the water surface of the canal 13C, that can buoyantly support a boat, ship, barge or other marine vehicle thereupon. To minimize or avoid disruption of shipping traffic, excavation and construction of the very large pressure-containing pipe 2 or multiple pipes, can optionally take place in winter periods when the Welland Canal is closed to navigation. Water sourced from the upper level water body (Lake Erie 5LE) can optionally be beneficially sourced and used for waterjet and pressurized water uses associated with the excavation and pipe construction work.

Figure 5D:
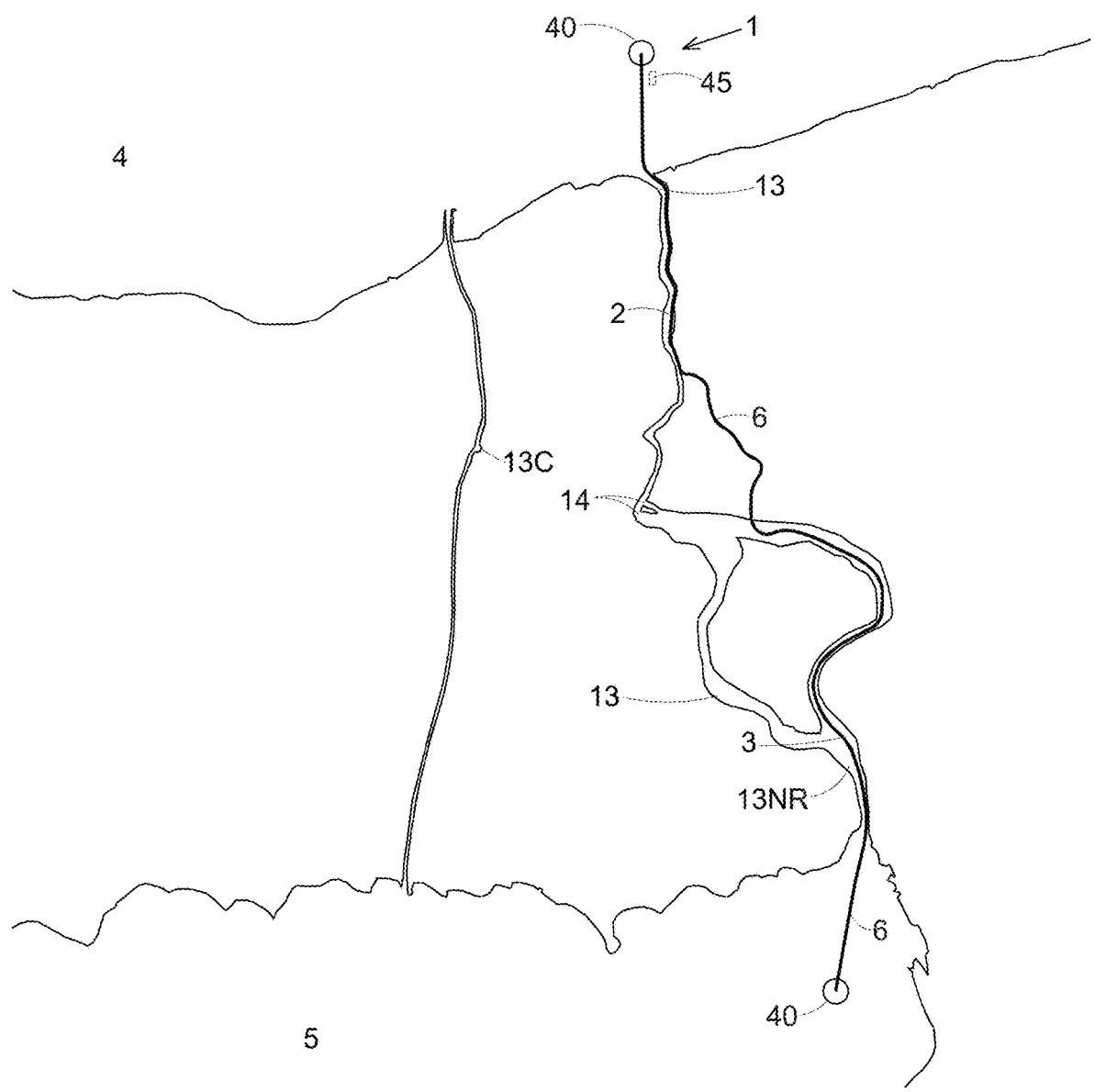

In the embodiment of FIG. 5D, a pumped storage system (with waterfall control subsystem) 1 is shown implemented with a pressure-containing pipe 2 that connects the lower elevation water body 4 being Lake Ontario, with the upper elevation water body 5 being Lake Erie. The pressure-containing pipe 2 serves as a pressure-containing water connection path 3. The pressure-containing pipe 2 traverses in part under a surface corridor 6 that to considerable extent follows the course of a river 13, the Niagara River 13NR shown without limitation. A part of the pressure-containing pipe 2 is also shown underground beneath land, being Goat Island in the Niagara River, without limitation. Without limitation, the pressure-containing pipe may have a width of 360 feet and be constructed at least 5 feet below the surface of the underwater surface of the river 13, wherein the surface corridor 6 comprises to considerable extent the water surface of at least one of the upper elevation water body 5 (illustrated), the river 13, and the lower elevation water body 4, which water surface can buoyantly support a boat, ship, barge or other marine vehicle thereupon.

Figure 5E:
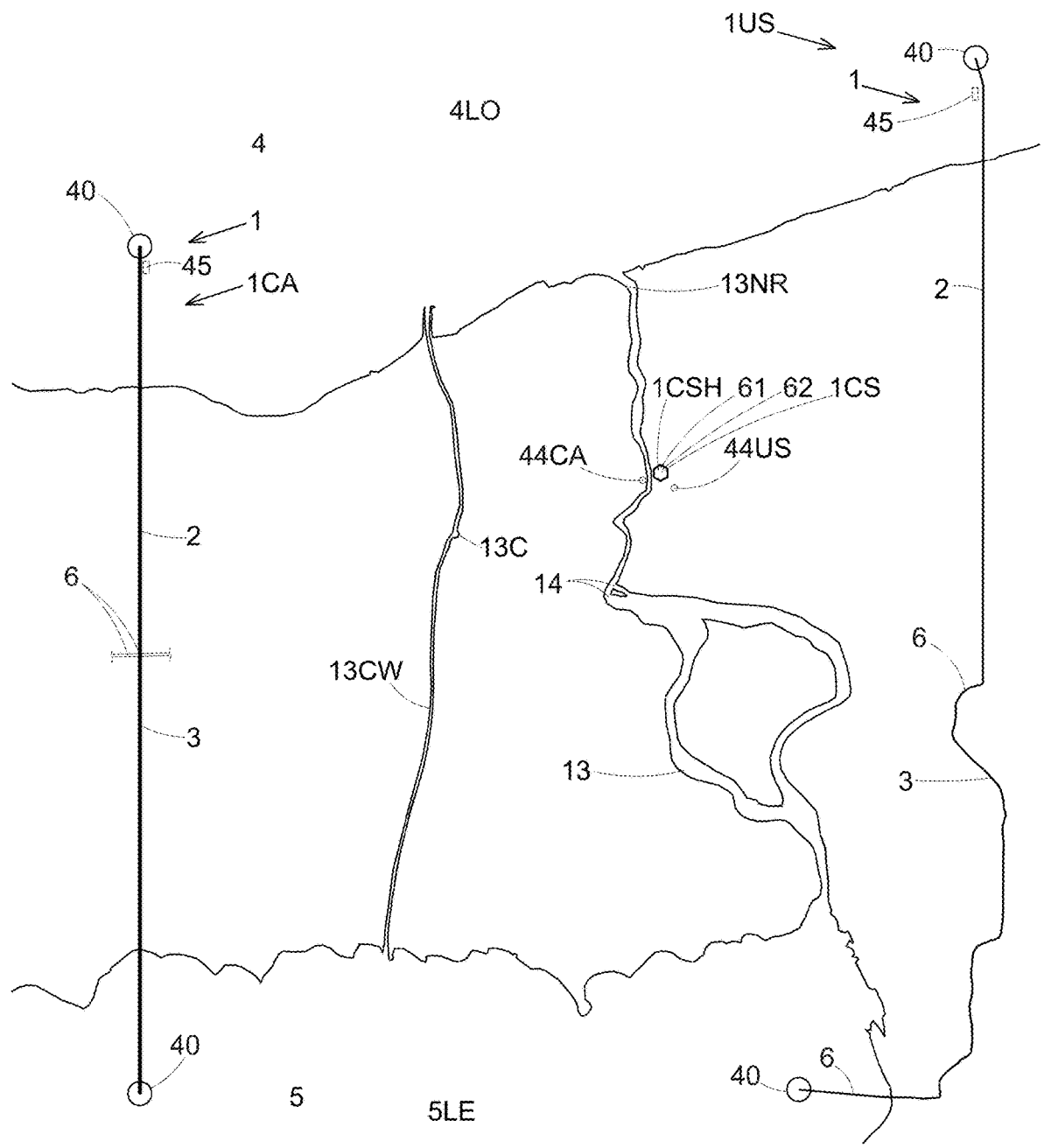

In the embodiment of FIG. 5E, two pumped storage systems (with waterfall control subsystems) 1 are shown, one being a Canadian pumped storage system with waterfall control subsystem 1CA and a United States pumped storage system with waterfall control subsystem 1US. Each of these two pumped storage systems with waterfall control subsystems 1 connects the lower elevation water body 4 being Lake Ontario 4LO with the upper elevation water body 5 being Lake Erie 5LE. It is possible that these two systems could be built and implemented in a time-phased manner to bring added pumped storage energy storage capacity online when more is needed as renewable energy sourcing advances to higher and higher penetration levels potentially all the way up to 100% renewable energy sourcing for all North American electric energy needs. By having two separate and independently routed and independently operable systems, some added redundancy and redundancy management and fault tolerance and reconfiguration possibilities are enabled, including continued operation of a pumped storage system with waterfall control subsystem even if either the US or Canadian line becomes fully inoperative following a disaster or terrorist event such as a major earthquake or a large bomb or explosive event. The fully inoperative system can be assured to be fail-safe by having a sufficient number of independent controllable valves 25 (not shown in this Figure but described earlier in the context of FIGS. 1B, 1C, 4A and 4B) that can shut off any unintended flow between the upper and lower elevation water bodies. The independently operable Canadian and US pumped storage systems can be directly grid-tied to the Canadian and US electric grids and/or smart grids respectively, with the understanding that mutually beneficial cross-ties and cross-linking and integrated optimization systems are of course possible and highly desirable for implementation for mutual benefits for the two largest nations of North America. While FIG. 5E illustrates two particular representative pathways in Canada and the U.S.A. respectively for the pressure-containing pipe 2 routings for the pumped storage system with waterfall control subsystem 1CA and the pumped storage system with waterfall control subsystem 1US, it should be understood that many alternate routings in Canada, in the U.S.A. and in paths traversing both Canada and the U.S.A., are possible within the spirit and scope of the invention as claimed. In a similar manner, different portions of the pressure-containing pipe 2 may be underground, underwater, under an underwater ground surface, on a surface, or above a surface as on an elevated structure such as a bridge or aqueduct.

FIG. 5E also illustrates two existing smaller-scale pump-generating plants adjacent the lower part of the Niagara River 13NR, these being the Sir Adam Beck Pump Generating Station or first supplementary pump-generating plant 44CA, and the portion of the Robert Moses Niagara Power Plant that comprises the Lewiston Pump Generating Plant or second supplementary pump-generating plant 44US. Note that the pumped storage system with waterfall control subsystem 1 of the present invention, will preferably utilize coordinated and/or integrated control with the all ancillary or connected supplementary storage and generation and flow management subsystems, in the case of the Niagara region these being the Sir Adam Beck Pump Generating Station or first supplementary pump-generating plant 44CA, the Lewiston Pump Generating Plant or second supplementary pump-generating plant 44US, the Robert Moses Niagara Power Plant that captures some hydroelectric power from water sourced from the upper Niagara River and some pumped storage part of the Lewiston Pump Generating Plant, and finally a flow management subsystem that manages net water flow from Lake Erie 5LE to Lake Ontario 4LO through the Welland Canal 13CW and its lock systems.

FIG. 5E thus illustrates a pumped storage system with waterfall control subsystem 1, wherein said control system means 1CS further comprises control coordination means for coordinating control with at least one of (i) a secondary hydroelectric power system using a water flow path separate from said pressure-containing pipe 2, (ii) a secondary pumped storage system using a water flow path separate from said pressure-containing pipe 2, (iii) a canal locks control system for controlling locks and water flows in a canal 13C connecting said upper elevation water body 5 to said lower elevation water body 4.

Master control of the control system means 1CS is here implemented, without limitation, in a control system headquarters 1CSH which includes a monitoring subsystem 61 and an operator interface subsystem 62. The control system headquarters 1CSH may also provide control or provide control coordination to a wide variety of energy storage subsystems (e.g., battery bank elements, hydrogen storage elements, chemical storage elements, thermal storage elements, flywheel or kinetic energy storage elements, and other energy storage elements) and a wide variety of power source subsystems (e.g., solar, wind, hydroelectric, hydrokinetic, tidal, geothermal, ocean thermal, trans-ice thermal, thermal, rapid-response gas power subsystems and other power source subsystems).

Figure 5F:
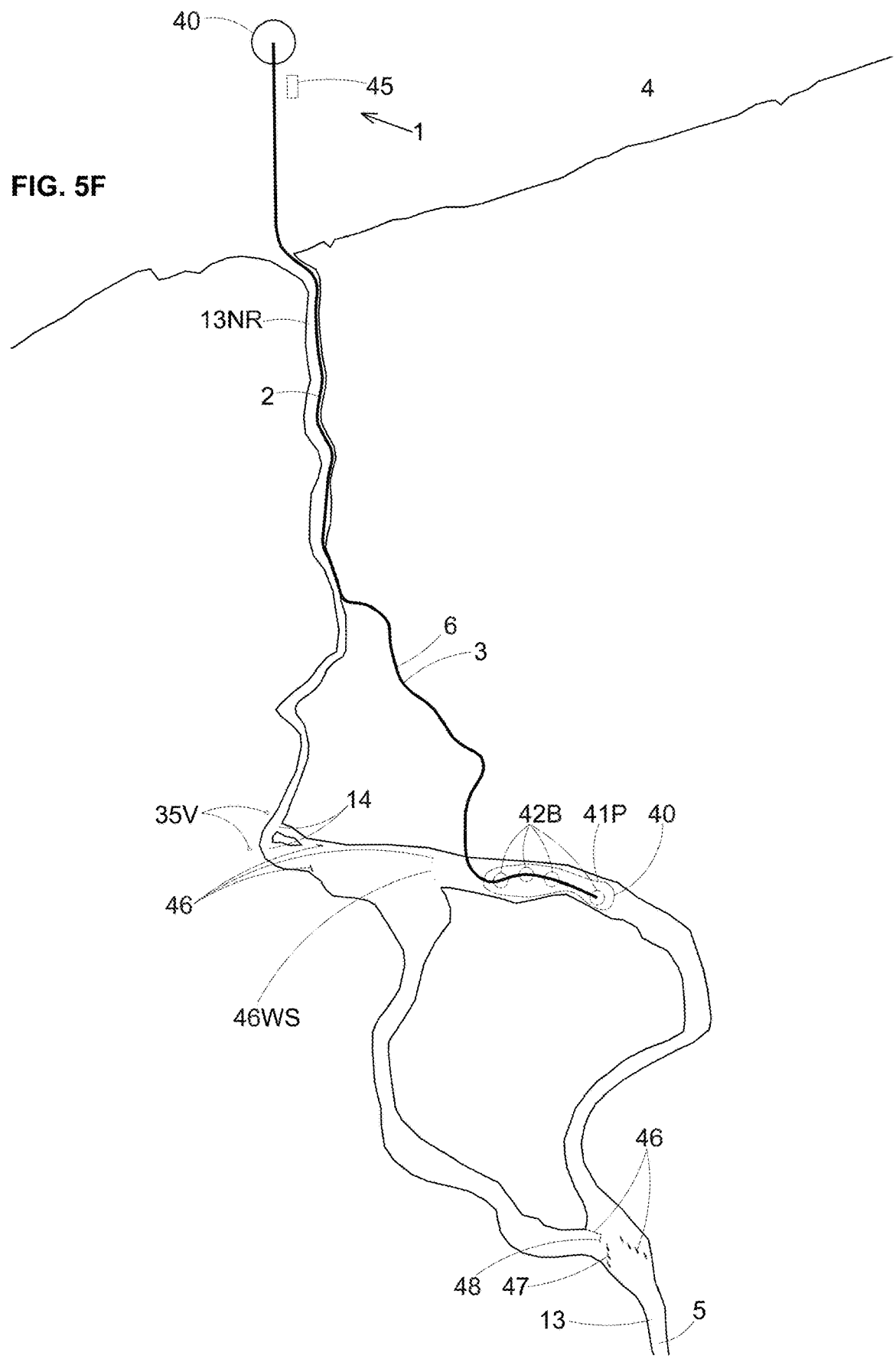

FIG. 5F illustrates a waterfall 14 (e.g., Niagara Falls) in the course of a river 13 (e.g., Niagara River) that carries a natural gravity-driven flow of water from an upper elevation water body (e.g., Lake Erie flowing into the river 13 at the bottom of this illustration) to a lower elevation water body 5 (e.g., Lake Ontario), along with a pumped storage system with waterfall control subsystem 1 that can pump water from the lower elevation water body 4 to the upper elevation water body. The preferred embodiment illustrated in FIG. 5F also shows several instances of a controllable water deflection subsystem 46 wherein a water deflection subsystem may employ one or more of a deployable flow control panel, a controllable vane for flow control 47, a controllable weir for flow control 48, a rotating flow control device, a translating flow control device, an extensible flow control device and a flow control device of another type.

FIG. 5F also illustrates a pumped storage system with waterfall control subsystem 1, further comprising a multiobjective control subsystem also serving as erosion management means for limiting erosion of at least one of said lower elevation water body 4, said upper elevation water body 5, said river 13 and said waterfall 14. For example and without limitation, riverbed erosion in parts of the river 13 that is the Niagara River 13NR, and waterfall erosion and retreat at waterfall 14 can be kept within acceptable limits by actuation of one or more members of the controllable water deflection subsystem 46.

A controllable vane for flow control 47 can influence and partially control water velocity distributions downstream of the controllable vane. A controllable weir for flow control 48 is illustrated just upstream of the Grand Island bifurcation on the Niagara River in the illustration, that can be operated in conjunction with controllable vanes for flow control 47 to adjust flow volumetric rates on the channels east and west of Grand Island. In a similar manner the controllable vanes for flow control 47 illustrated just upstream (below and to the right in the illustration) of the waterfall 14 can be deployed to vary flow and manage erosion in the Horseshoe Falls vs. the American Falls of Niagara Falls as shown by the waterfall 14 in the Niagara River 13NR. In the illustrated embodiment of FIG. 5F, the upper termini of the pressure-containing pipe 2 are implemented through multiple bellmouth water inlets 42B surrounded by a safety subsystem 40 including a perimeter safety sheet 41P, as illustrated. When the pumped storage system is operating in pumping mode, water from the lower elevation water body 4 is pumped up and comes out through these bellmouth water inlets 42B to the north of Grand Island, and a riverbed upward deployable subsurface wall system 46WS just downstream is shown, that serves as a controllable water deflection subsystem 46 that can prevent pumped up water from just immediately returning back downstream through Niagara Falls with excessive volume and power and erosion, rather than flowing around the east end of Grand Island and pumping up the water level in the upper elevation water body 5 that is integrally connected with Lake Erie.

Based on modeling of erosion as a function of key driving parameters (e.g., water flow rates, velocity fields, turbidity and sediment transport, waves and currents and winds and surface ice, tidal effects, underwater surface topography, soil and sand and rock characteristics, and other parameters) and the derivatives (including single derivatives and multiple derivatives) and integrals (including single integrals and multiple integrals) and frequency-filtered modifications of those parameters, control laws can be implemented to mitigate erosion and keep it within acceptable limits, where the control laws implement known techniques of open-loop control, closed-loop control, proportional-integral-derivative control, target-following control and optimal control to achieve the desired multiobjective optimization whilst managing control stability requirements, fault tolerance and reconfiguration, and power loss mechanisms minimization. Erosion-driven waterfall location geographical retreat progression with time of the waterfall 14, can also be similarly be kept within limits that are deemed acceptable.

FIG. 5F also illustrates a pumped storage system with waterfall control subsystem 1, further comprising a camera 35V capturing a view of the waterfall 14 and an image analysis program acting on said view to compute a visual appeal parameter, and wherein said visual appeal parameter is an input to said waterfall control subsystem 1W. Note that the camera 35V may be a visual image sensor and/or an imaging sensor working at radiation frequencies outside normally visible frequencies and/or an imaging sensor working on other principles of physics, e.g. doppler radar, LIDAR, ultrasound imaging and other imaging devices and subsystems known from the prior art of imaging technologies. Output from the camera 35V or plural cameras can be processed by pattern recognition and image recognition and image stitching methods, along with optional expert systems and artificial intelligence methods, to compute one or more visual appeal parameters, also considering times when more tourists are present, lighting conditions, cloud cover conditions, wind conditions, spray and mist pattern conditions, and other quantifiable and nonquantifiable considerations. Use of past, current and projected/forecast future visual appeal parameter values can also be used as inputs to command synthesis functions for maintaining appropriate water flow rate and flow patterns over the waterfall 14, which command synthesis functions may issue commands to plural members of the controllable water deflection subsystem 46.

FIG. 5F thus further illustrates a pumped storage system with waterfall control subsystem 1, wherein a multiobjective control subsystem further includes a controllable water deflection subsystem 46 upstream of said waterfall, wherein control through actuation of said water deflection subsystem 46 impacts at least one of water velocity direction, water velocity magnitude, water kinetic energy, water flow rate, waterfall visual appearance, waterfall stream pattern, waterfall spray pattern, waterfall mist pattern, and waterfall sound. The multiobjective control subsystem may utilize inputs from sensor means as well as operator inputs and inputs on current and/or past and/or forecast future wind, temperature, precipitation, light conditions, water surface conditions, ice conditions and other inputs, and may utilize one or more of a computer, a machine learning subsystem, an artificial intelligence subsystem, an expert subsystem. The water deflection subsystem 46 may comprise one or more of: deployable barriers (e.g. by translation and/or rotation and/or roll-out means and/or shape-changing means, without limitation), deployable sluices, deployable weirs, deployable gates, deployable dams, deployable flow diverters, deployable vanes, deployable vortex generators, deployable control surfaces, deployable rakes, deployable strainers, deployable meshes, deployable nozzles, fish-transit-permitting, fish-transit-inhibiting and/or other deployable or actuation-operable devices known in the art, in addition to non-deployable or fixed members known in the art. The water deflection subsystem 46 may serve as means to prevent excessive water velocity fields and/or excessive water flow rates in all or part of the river 13, for example in the case where the pumped storage system with waterfall control subsystem 1 has pumped the water level in the upper elevation water body 5 to above-normal levels. The water deflection subsystem 46 may alter flow patterns to different waterfalls or waterfall regions or segments for visual appeal and/or erosion limiting and/or flow management and/or other purposes, as for example altering flows to the Horseshoe Falls and/or the American Falls or portions thereof respectively at Niagara Falls. The water deflection subsystem 46 may contribute to enabling the multiobjective control subsystem to optimally achieve objectives and balance achievement of objectives related to energy and power, ecological objectives, environmental objectives, safety objectives, erosion objectives (e.g., bed erosion, shore erosion and other erosion, erosion-induced waterfall geographic retreat), harm minimization objectives and touristic and visual appeal objectives, as well as other objectives. The water deflection subsystem 46 operating to keep waterfall geographic retreat within acceptable parameters may also help assure long-term operation of the pumped storage system with waterfall control subsystem 1 despite the waterfall geographic retreat (e.g., in the case of Niagara Falls retreat upriver towards Lake Erie).

The water deflection subsystem 46 and associated and ancillary subsystems may also include features to minimize hazards or threats to humans, land & water & amphibious living beings. In terms of tourist appeal objectives, the water deflection subsystem 46 can be operated to affect flow rate over different parts of the waterfall 14, affect visual aspects from different viewpoints, affect spray patterns including consideration of local wind and gust fields, and affect mist patterns as well.

Figure 5G:
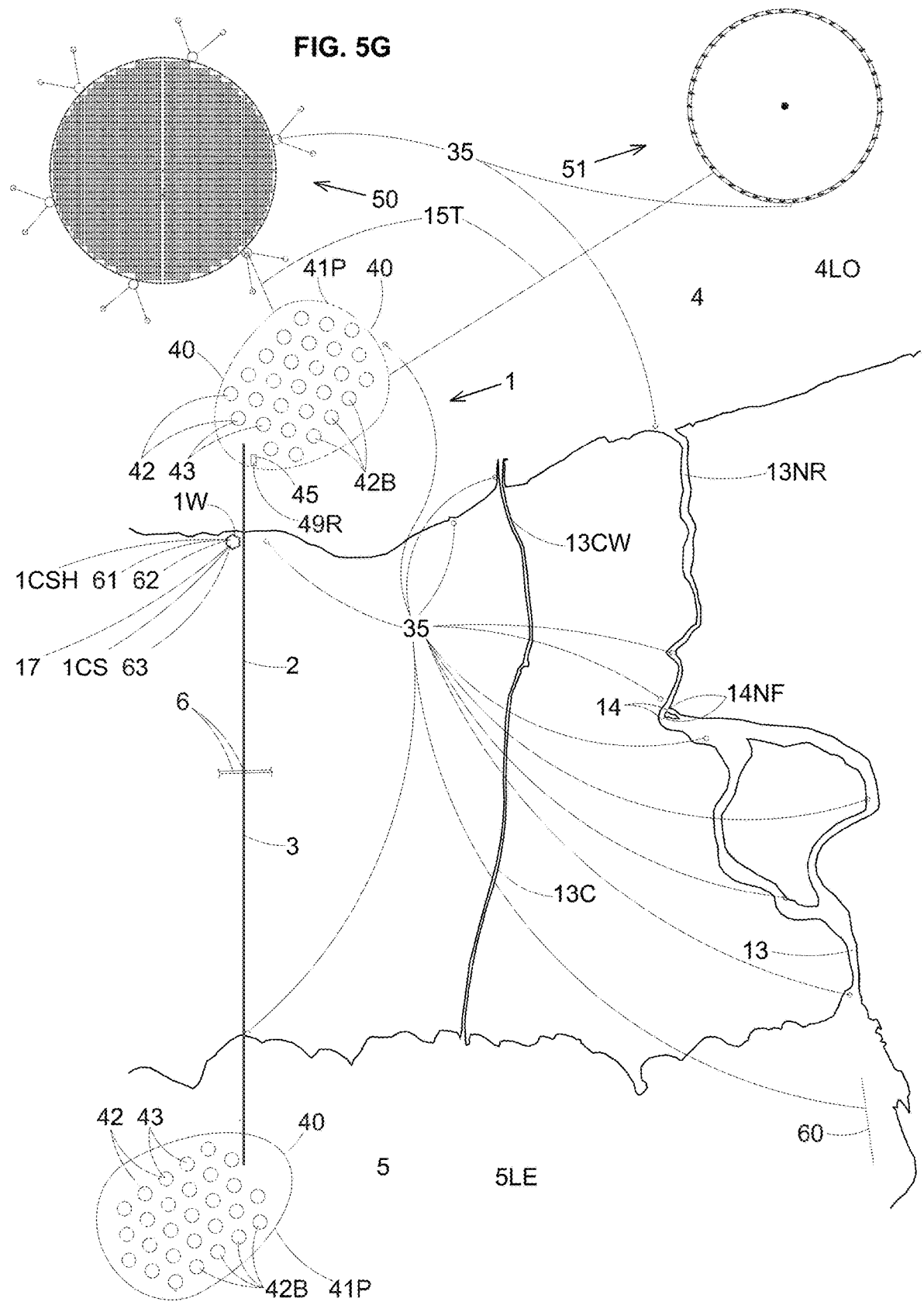

FIG. 5G shows a preferred embodiment of the invention similar in some respects to the preferred embodiment shown and described in FIG. 5B. FIG. 5G shows a waterfall 14 (e.g., Niagara Falls) in the course of a river 13 (e.g., the Niagara River) that carries a natural gravity-driven flow of water from an upper elevation water body 5 (e.g., Lake Erie) to a lower elevation water body 4 (e.g., Lake Ontario), along with a pumped storage system with waterfall control subsystem 1 that can pump water from the lower elevation water body 4 to the upper elevation water body 5.

FIG. 1C thus illustrates a pumped storage system with waterfall control subsystem 1, for the particular highly preferred embodiment (without limitation) wherein said lower elevation water body 4 comprises Lake Ontario 4LO, said upper elevation water body 5 comprises Lake Erie 5LE, said river 13 comprises the Niagara River 13NR and said waterfall 14 comprises Niagara Falls 14NF.

The embodiment of FIG. 5G also shows the use of a plurality of water inlets 42, water outlets 43 and bellmouth water inlets 42B at both the lower elevation water body 4 and upper elevation water body 5. The plurality of inlets and outlets and bellmouth inlets combined inlet/outlets can be appropriately sized, shaped and arranged to meet multiple objectives including flow fields during pumping and generating phases, erosion parameters (e.g., as pertaining to shoreline erosion, riverbed erosion, waterfall erosion and retreat, and lakebed erosion), safety parameters (e.g., as pertaining to humans, vehicles, buildings, animals, marine animals and fish, and other animals or plants), efficiency and performance parameters of the pumped storage system with waterfall control subsystem 1, touristic parameters (e.g., as pertaining to the waterfall 14 and other tourist areas at shorelines, lake and river environments and other areas), and other parameters. The plurality of inlets and outlets in each water body are each protected by a safety subsystem 40 and each including a perimeter safety sheet 41P (e.g. cylindrical topology wedgewire screen sheet, without limitation). The safety subsystem 40 may also include visual, aural, artificial speech, tactile and other warning systems swimmers, boaters, water vehicles, underwater vehicles, ground vehicles and air vehicles, as well as for animals, marine animals, fish as well as humans in proximity regardless of how or why they might be in a location proximal to the pumped storage system with waterfall control subsystem 1.

FIG. 5G also shows offshore solar and wind energy harvesting systems that provide energy to the pumped storage system with waterfall control subsystem 1, utilizing electrical power transmission via an electrical power transmission subsystem 15T such as underwater cable for power transmission and associated data transmission as well. The offshore solar energy harvesting system that is shown is a Concentrating Offshore Solar (COS) system 50 comprising a float-supported connected array of Sun-tracking concentrating solar modules (1,920 in illustrated embodiment), with none of the specific COS system features to be construed as limiting with respect to solar energy harvesting systems that can provide energy to the present invention. The COS system 50 is of a type described in the prior art in U.S. Pat. No. 9,404,677, and can be of megawatt or gigawatt scale or other scales without limitation. The solar modules can include a concentrating photovoltaic (CPV) electric power generation subsystem complemented by a solar thermal electric power generation subsystem; and a perimeter waste heat transfer subsystem and/or ice-prevention bubbler subsystem can be provided for preventing freezing/water-surface icing of an outer water ring around the COS system, to enable the COS system to continue to revolve in azimuth for the azimuthal portion of heliostatic tracking, even in winter lake surface freezing conditions. The offshore wind energy harvesting system that is shown is a Revolving Overhead Windmill (ROW) system 51 comprising a partially aerostatically supported vertical axis wind turbine, with none of the specific ROW system features to be construed as limiting with respect to wind energy harvesting systems that can provide energy to the present invention. The ROW system 51 is of a type described in the prior art in U.S. Pat. No. 9,546,643, and can be of megawatt or gigawatt scale or other scales without limitation. It should be noted that the ROW system works better at larger scales because of square-cube law effects with wind power scaling with area and with aerostatic lift of lifting gas (hydrogen or helium) scaling with volume.

FIG. 5G also shows control system headquarters 1CSH which houses a waterfall control subsystem 1W; control system means 1CS for generating and transmitting pump control commands to a pump and generator control commands to a generator and associated subsystems of the pumped storage system with waterfall control subsystem 1; a multiobjective control subsystem 17; a monitoring subsystem 61; and an operator interface subsystem 62 for use by an operator 63. Lines of connectivity of power lines and data lines for the pumped storage system with waterfall control subsystem 1 and connected sensor subsystems and forecast receiving subsystems and energy source subsystems and grid/smart grid subsystems are not shown in FIG. 5G, to avoid undue clutter in the Figure, with appropriate redundant power connection and data connection architectures known from the prior art being presumed to be designed and implemented.

FIG. 5G illustrates a preferred embodiment of the invention similar to that of FIG. 1C, showing a pumped storage system with waterfall control subsystem 1, comprising in combination:

a pressure-containing pipe 2 providing a pressure-containing water connection path 3 between a lower elevation water body 4 and an upper elevation water body 5, said pressure-containing pipe 2 at least partially traversing beneath a surface corridor 6 suitable for supporting a vehicle 7 thereupon;

a pump for using input energy comprising electrical energy (e.g. from the COS system 50 and/or the ROW system 51) in a pumping time window, to pump water from said lower elevation water body 4 to said upper elevation water body 5 through said pressure-containing pipe 2 with an upward water flow with opposed direction relative to a natural gravity driven downward water flow through a river 13 and a waterfall 14 from said upper elevation water body 5 to said lower elevation water body 4;

a generator for generating electrical power in a generating time window, from gravity driven downward water flow from said upper elevation water body 5 to said lower elevation water body 4 through at least portions of said pressure-containing pipe 2 and through a turbine connected to said pressure-containing pipe 2, wherein said turbine drives a generator;

and a waterfall control subsystem 1W (implemented here on barge 45, without limitation) comprising in combination:

i) at least one of (a) sensor means 35 for sensing at least one of water level and water flow rate and water image, and (b) forecast receiving means for receiving meteorological forecast data on at least one of future precipitation, future temperature, future insolation and future wind;

ii) computer target generation means for effectively defining at least one of a future time window upper elevation water body level target function and a future time window waterfall flow rate target function, said target functions being dependent on at least one of said meteorological forecast data and on some data from said sensor means 35; and iii) control system means dependent on some data from said sensor means 35 and also dependent on at least one of said target functions, for generating and transmitting pump control commands to said pump and generator control commands to said generator and associated subsystems.

FIG. 5G also illustrates the pumped storage system with waterfall control subsystem 1, wherein said control system means 1CS further serves as control means for commanding deployment of power generation from a rapid-response power station 49R, in a deficit power production time window associated with occurrence of at least one of (i) said upper elevation water body level target function matching a minimum upper elevation water body level, and (ii) said waterfall flow rate target function matching a minimum waterfall flow rate level. The deficit power production time window may be a current or projected deficit power production window, as associated for example with sudden cloud cover causing a rapid spike downwards in power into an electric grid/smart grid from the Concentrating Offshore Solar (COS) system 50. The rapid-response power station 49R may be gas-fueled (e.g. natural gas fueled or hydrogen fueled, with hydrogen sourced by water electrolysis during periods of high output from the COS system well exceeding customer power demand), or liquid-fueled (e.g. oil-fueled), for example and without limitation. The rapid-response power station 49R is shown on the barge 45, but in variant embodiments it could be located in other locations including land locations.

FIG. 5G also illustrates a pumped storage system with waterfall control subsystem 1, further comprising a multiobjective control subsystem also serving as erosion management means for limiting erosion of at least one of said lower elevation water body 4, said upper elevation water body 5, said river 13 and said waterfall 14. For example and without limitation, riverbed erosion in parts of the river 13 that is the Niagara River 13NR, and waterfall erosion and retreat at waterfall 14 that is Niagara Falls 14NF (including the Horseshoe Falls and American Falls) can be kept within acceptable limits by receiving inputs from the many sensor means 35 (including cameras, water depth sensors, water flow sensors, river sensors, lake sensors, shoreline sensors, meteorological sensors for temperature and wind and rain/snow/sleet/hail and water surface icing and other meteorological/weather-related parameters, electrical sensors, renewable energy subsystem sensors and other sensors) and processing these through appropriate combinations of a computer, artificial intelligence subsystem, machine learning subsystem, expert system subsystem, pump and turbine and generator subsystems, actuation subsystems and other subsystems.

FIG. 5G also illustrates a pumped storage system with waterfall control subsystem 1, further comprising a monitoring subsystem 61 for receiving sensor inputs (e.g. from the illustrated and additional sensor means 35) and synthesizing for monitoring at least one of an environmental parameter and an erosion parameter and an ecological parameter; further comprising an operator interface subsystem 62 for an operator 63 to monitor information from said monitoring subsystem and for said operator to make command inputs; and further comprising override means for transmitting an override command to said multiobjective control subsystem wherein said override command is issued from at least one of said operator interface subsystem and said monitoring subsystem. The operator interface subsystem 62 may include information displays to provide information to the operator for normal and non-normal operation of the pumped storage system with waterfall control subsystem 1, including advisory, caution and warning indications and information to the operator by visual, aural and tactile means. Safety related monitoring including video monitoring (from fixed cameras, aimable cameras, scanning cameras and vehicle mounted cameras such as drone-mounted cameras) can be provided, to alert an operator to potential safety hazards to humans such as swimmers, divers, people in boats or submarines or other vehicles, marine animals and fish, land animals, birds and bats, and other potential life forms that may face hazards or threats. Security related monitoring can also be provided, with sensing, monitoring, threat-detection, threat-identification and warning and protective systems (e.g. with loudspeakers, lights and displays as well as potentially fences with electric actuation and remote-control protection & rescue systems and remote-control defensive or offensive weaponry). Security systems should ideally provide enhanced security relative to a variety of human and non-human threats, including hackers, cybercriminals, criminals, vandals, thieves, saboteurs and terrorists.

FIG. 5G shows a pumped storage system with waterfall control subsystem 1, further comprising a safety subsystem 40 for reducing safety risks to more than one of: humans, marine animals, land animals, amphibians, birds, bats, insects and plants. Note that the safety subsystem 40 may further comprise one or more of: fences, warning systems connected to detection systems, filter and screen systems, life-threat minimizing systems, warning buoys, lights, fluorescent reflectors, multiple valves, computerized systems including Failure Modes and Effects Analysis (FMEA), fault tree, redundancy & redundancy management, failure detection, isolation & correction/recovery subsystems and other safety and warning subsystems know in the prior art, without limitation. Inputs to the safety subsystem 40 as well as to the overall pumped storage system with waterfall control subsystem 1 and related energy source systems and grid/smart grid systems may be received from the plurality of sensor means 35 that are illustrated, as well as many other sensors not shown in the map field of view of FIG. 5G, and further inclusive of still other sensors not in the map field of view of FIG. 5G, such as sensors in the regions of Lake Superior, St. Mary's River, Lake Michigan, Straits of Mackinac, Lake Huron, St. Clair River, Lake St. Clair, Detroit River, upper Lake Erie, lower Lake Ontario, St. Lawrence River and St. Lawrence Seaway.

Figure 6:
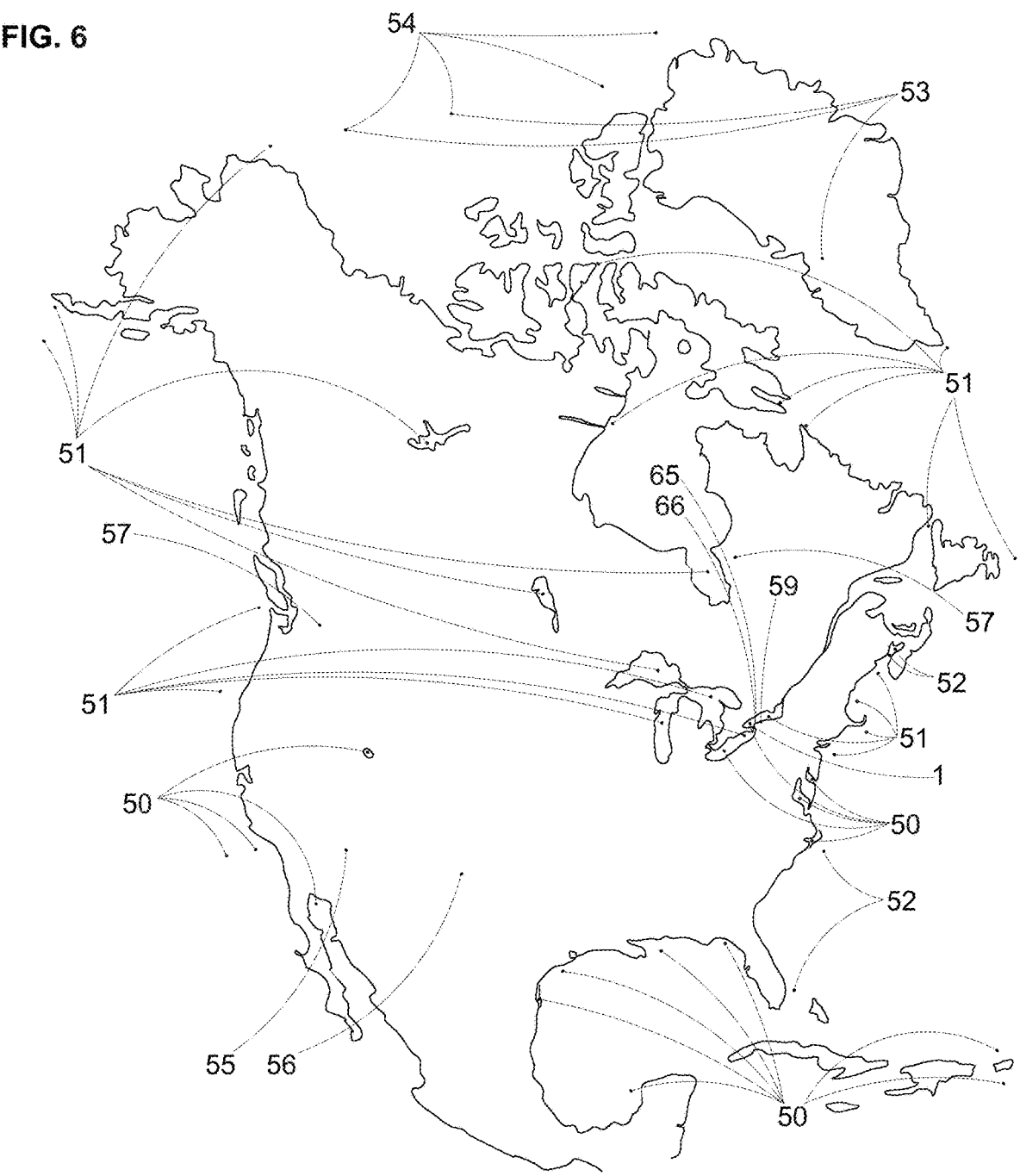
FIG. 6 shows a map of North America illustrating representative renewable power system sources that could optionally be grid-tied into a pumped storage system with waterfall control subsystem in the Lake Erie/Niagara Region/Lake Ontario area.

FIG. 6 shows a map of North America illustrating representative renewable power system sources that could optionally be grid-tied to provide input energy into a pumped storage system with waterfall control subsystem 1 in the Lake Erie/Niagara Region/Lake Ontario area as described earlier in the descriptive portion of this specification along with associated drawings. On the scale of this Figure it is not possible to show specific details of power and data connections 66 of a smart grid system 65 that connects the various representative renewable power sources, additional fossil fuel power sources, the pumped storage system with waterfall control subsystem 1 and additional energy management and storage subsystems.

Transmission technologies, power conditioning technologies, power switching technologies, grid connection technologies, smart grid technologies, superconducting technologies, HVDC technologies, hydraulic and fluid flow management technologies, underground and underwater engineering technologies, sensor technologies, redundancy management & failure reconfiguration technologies, model based engineering & simulation technologies, computer technologies including machine learning & artificial intelligence & expert systems, and energy conversion and storage technologies known in the prior art can be included as needed and beneficial for large scale system integration, system optimization, system management, and system failure management and reconfiguration purposes.

FIG. 6 shows a plurality of feasible locations for implementation of a large-scale Concentrating Offshore Solar (COS) system 50, comprising a float-supported connected array of Sun-tracking concentrating solar modules (1,920 in illustrated embodiment, not to be construed as limiting). In one preferred embodiment, the solar modules comprise a concentrating photovoltaic (CPV) electric power generation subsystem complemented by a solar thermal electric power generation subsystem. Representative feasible locations are shown in the Pacific Ocean off the coast of California, in the Gulf of California in Mexico, the Great Salt Lake in Utah, at several U.S. and Mexican locations in the Gulf of Mexico (e.g. Laguna Madre in Texas), in offshore locations near Puerto Rico and the West Indies, in U.S. Atlantic Seaboard locations such as Delaware Bay, Chesapeake Bay and Pamlico Sound, and Great Lakes locations such as Lake Ontario and Lake Erie. COS systems are described further in U.S. Pat. No. 9,404,677, and may be megawatt scale or gigawatt scale without limitation. Other classes of offshore solar energy harvesting systems could be used and linked to the pumped storage system with waterfall control subsystem 1, within the spirit and scope of the present invention. From the well-understood prior art of the physics of pumped storage systems, it can be readily understood that using pumped storage from Lake Ontario to Lake Erie can be applied for storage of energy from gigawatt scale solar energy harvesting systems such as COS systems or other classes of offshore solar energy harvesting systems, where for example and without limitation, 100 GW×12 daytime hours or 1200 GW-hr corresponds to gravitational potential energy of 3186 trillion foot-pounds, equivalent to 0.56 foot water level rise over a pumped storage upper elevation water body surface area of 277. billion sq.ft. (9940 sq.mi., the nominal surface area of Lake Erie), given water weight 62.4 pounds per cubic foot & a pumped elevation rise of 325 feet (the nominal rise from Lake Ontario to Lake Erie).

FIG. 6 shows a plurality of feasible locations for implementation of a large-scale Revolving Overhead Windmill (ROW) system 51, comprising innovative at least partially aerostatically supported vertical axis wind turbines described further in U.S. Pat. No. 9,546,643. Representative feasible locations are shown offshore from Alaska, Washington State, Oregon, California, New Jersey, New York, New England, the Canadian Maritime Provinces, Nunavut and Kalaallit Nunaat, and all the Great Lakes as well as Lake Winnipeg in Manitoba and Great Slave Lake in the Northwest Territories of Canada. ROW systems may be megawatt scale or gigawatt scale without limitation. Other classes of offshore wind energy harvesting systems could be used and linked to the pumped storage system with waterfall control subsystem 1, within the spirit and scope of the present invention.

FIG. 6 shows a plurality of feasible locations for implementation of a large-scale Synergistic Current and Offshore Wind (SCOW) system 52 (further described in U.S. Pat. No. 7,750,491), for concurrent harvest of tidal current/ocean current plus offshore wind. Locations shown include in the Bay of Fundy near Nova Scotia, New Brunswick and Maine (to capture offshore wind plus tidal current energy) and offshore from the Eastern Seaboard of America (e.g. offshore from Florida and North Carolina, without limitation, to capture offshore wind plus Gulf Stream ocean current energy). SCOW systems may be megawatt scale or gigawatt scale without limitation, and other locations than those shown are also possible within the spirit and scope of the invention.

FIG. 6 shows a plurality of feasible locations for implementation of a Revolving Iceboats Power (RIP) system 53 (further described in U.S. Pat. No. 7,714,457 and Canadian patent 2,644,942). Representative locations are shown in the Arctic Ocean on sea ice and on the Kalaallit Nunaat icecap, but other locations in Arctic and Northern areas (e.g. Northern Canada and Alaska) are also possible.

FIG. 6 shows a plurality of feasible locations for implementation of an Ice Sheet Thickening Renewable Energy System (ISTRES) 54 that may harvest wind energy and may also comprise a Floating Ice Sheet Based Renewable Thermal Energy Harvesting System, as described further in U.S. Pat. No. 8,393,553. Locations are shown in the Arctic Ocean, without limitation.

FIG. 6 shows a representative feasible location for implementation of an onshore solar power harvesting system 55, which could be of any of many known types including photovoltaic (PV), concentrating photovoltaic (CPV, also optionally with cogeneration as in the instance of some embodiments of U.S. Pat. No. 7,997,264), solar thermal, central receiver solar thermal, and other types of solar and solar hybrid power harvesting systems. A representative location in the southwest quadrant of the U.S.A. is shown, but many other locations are possible without limitation.

FIG. 6 shows a representative feasible location for implementation of an onshore wind power harvesting system 56, which could be a conventional horizontal axis wind turbine or any of many types of onshore wind turbines that are known from the prior art. A representative location in the southwest quadrant of the U.S.A. is shown, but many other locations are possible without limitation.

FIG. 6 shows a plurality of feasible locations for implementation of a hydroelectric power harvesting system 57 of any type as known in the prior art. Representative feasible locations are shown at the Grand Coulee Dam hydroelectric powerplant in Washington State and Hydro-Quebec hydroelectric powerplants at and near the La Grande generating station, but many other locations exist and are possible according to the art of hydroelectric powerplant siting and implementation.

While FIG. 6 has been shown with a plurality of North American renewable energy sources, it should be understood that global renewable energy sources could also potentially be connected and tapped, if low loss long distance transmission means such as superconducting cables are incorporated.

Thus FIG. 6 illustrates a pumped storage system with waterfall control subsystem 1, wherein the input energy comprising electrical energy includes renewable source energy sourced from at least two of: (i) an onshore solar power system, (ii) an offshore solar power system, (iii) an onshore wind power system, (iv) an offshore wind power system, (v) a flying wind power system, (vi) a hydroelectric power system, (vii) a hydrokinetic power system, (viii) a tidal power system, (ix) an ocean thermal power system, (x) a trans-ice thermal power system, and (xi) a geothermal power system.

FIG. 6 also illustrates a pumped storage system with waterfall control subsystem 1, wherein a control system means further includes shunting system means for shunting some energy from a renewable source energy to an additional storage system 59, when at least one of (i) an upper elevation water body level target function matches a maximum upper elevation water body level and (ii) a waterfall flow rate target function matches a maximum waterfall flow rate level; and wherein said additional storage system comprises at least one of a battery bank, a chemical energy storage module, a hydrogen energy storage module, a flywheel energy storage module, and a pressurized gas energy storage module. In the case of a hydrogen energy storage module being provided, the hydrogen energy storage module may include an electrolysis module, a hydrogen combustion module and/or a hydrogen fuel cell module.

FIG. 6 also illustrates a pumped storage system with waterfall control subsystem 1, wherein a control system means further comprises smart grid integration means for power management integration of the pumped storage system with waterfall control subsystem 1 with a smart grid system 65 that is electrically connected to said pumped storage system with waterfall control subsystem 1.

Figure 7:
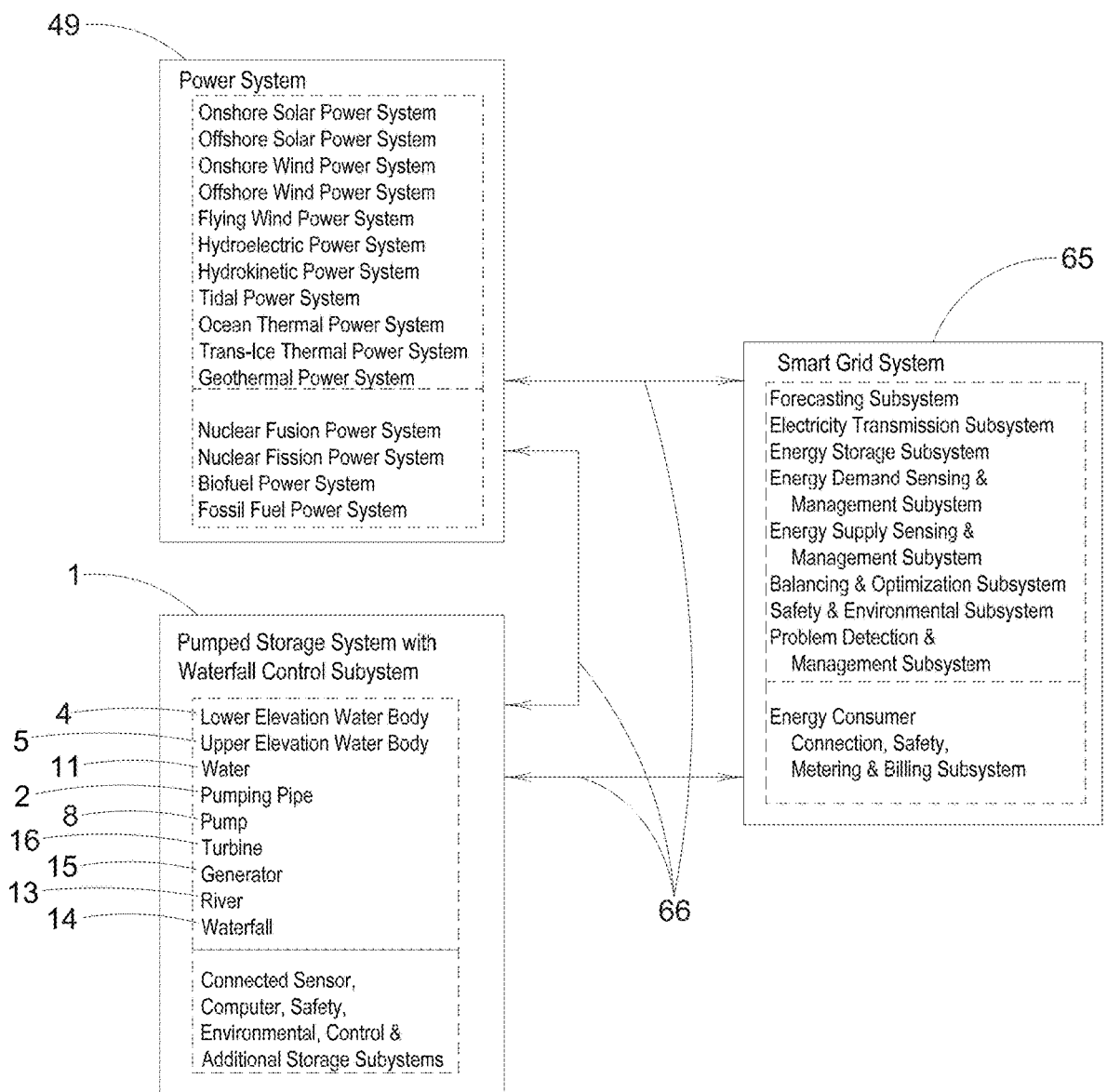
FIG. 7 diagrams three-way connectivity between (i) a Power System that produces electrical power, (ii) a Pumped Storage System with Waterfall Control Subsystem, and (iii) a Smart Grid System.

FIG. 7 diagrams three-way connectivity between (i) a Power System 49 that produces electrical power, (ii) a Pumped Storage System with Waterfall Control Subsystem 1, and (iii) a Smart Grid System 65. A large number of a variety of Power and Data Connections 66 provide appropriate connections between all three of (i) a Power System 49 that produces electrical power, (ii) a Pumped Storage System with Waterfall Control Subsystem 1, and (iii) a Smart Grid System 65, as well as internal to each and betwixt various subsystems of each and all of these.

Transmission technologies, power conditioning technologies, power switching technologies, grid connection technologies, smart grid technologies, superconducting technologies, HVDC technologies, hydraulic and fluid flow management technologies, underground and underwater engineering technologies, sensor technologies, redundancy management & failure reconfiguration technologies, model based engineering & simulation technologies, computer technologies including machine learning & artificial intelligence & expert systems, and energy conversion and storage technologies known in the prior art can be included as needed and beneficial for large scale system integration, system optimization, system management, and system failure management and reconfiguration purposes.

The use of multiple disparate sources of energy combined with a smart grid and the present pumped storage system with waterfall control subsystem 1 provides, in conjunction, a potent and reliable and robust integrated system that has real potential to enable extreme renewable energy penetration to meet baseload and variable North America power needs as a function of time, up to and including 100% renewable energy; whilst also optimally satisfying multiple objectives of safety for all, cost-effective energy, minimized waste, environmental responsibility, ecological acceptability, adequately low erosion, and human satisfaction & delight including tourist satisfaction & delight for tourists experiencing the waterfall that is subject of the waterfall control subsystem.

Thus FIG. 7 also illustrates a preferred embodiment of a pumped storage system with waterfall control subsystem 1, wherein input energy comprising electrical energy includes renewable source energy sourced from at least two of: (i) an onshore solar power system, (ii) an offshore solar power system, (iii) an onshore wind power system, (iv) an offshore wind power system, (v) a flying wind power system, (vi) a hydroelectric power system, (vii) a hydrokinetic power system, (viii) a tidal power system, (ix) an ocean thermal power system, (x) a trans-ice thermal power system, and (xi) a geothermal power system. The use of a plurality of renewable energy harvesting systems with power dropoff characteristics for disparate circumstances (e.g., night or cloud cover for solar power, low wind days for power, twice daily cycles at different phases for tidal stream & tidal barrage power, and also differential seasonal variations and meteorological condition variations, enable a system architected with plural renewable energy sources to have much lower statistical power variability than for the case of a single source, and correspondingly better ability to meet variable customer energy needs when combined with the present pumped storage system with waterfall control subsystem 1.

FIG. 7 also illustrates a pumped storage system with waterfall control subsystem 1, wherein a control system means further includes shunting system means for shunting some energy from a renewable source energy to an additional storage system or subsystem, when at least one of (i) an upper elevation water body level target function matches a maximum upper elevation water body level and (ii) a waterfall flow rate target function matches a maximum waterfall flow rate level; and wherein said additional storage system comprises at least one of a battery bank, a chemical energy storage module, a hydrogen energy storage module, a flywheel energy storage module, and a pressurized gas energy storage module. In the case of a hydrogen energy storage module being provided, the hydrogen energy storage module may include an electrolysis module, a hydrogen combustion module and/or a hydrogen fuel cell module.

FIG. 7 also illustrates a pumped storage system with waterfall control subsystem 1, wherein a control system means further comprises smart grid integration means for power management integration of the pumped storage system with waterfall control subsystem 1 with a smart grid system 65 that is electrically connected to said pumped storage system with waterfall control subsystem 1.

While certain preferred embodiments of the invention have been described in detail above with reference to the accompanying Figures, it should be understood that further variations and combinations and alternate embodiments are possible within the spirit and scope of the invention as claimed and described herein.

What is claimed is:

1. A method for storing gravitational potential energy in a pumped storage upper elevation water body having a natural gravity driven outlet flow through a river to a waterfall and then to a lower elevation water body, comprising:

transmitting input electrical energy to a pump in a surplus power production time window, using said input electrical energy to said pump, to pump water from said lower elevation water body to said pumped storage upper elevation water body, with said water being pumped through a pressure-containing pipe at least partially traversing beneath a surface corridor suitable for supporting a vehicle thereupon and with said water being pumped having an upward water flow with opposed direction relative to said natural gravity driven outlet flow through said river to said waterfall and then to said lower elevation water body;

and deploying a deployable water deflection subsystem located upstream of said waterfall to reduce water flow rate in the river upstream of the waterfall, during a time period when said water being pumped into said pumped storage upper elevation water body has raised the water level in said upper elevation water body to above a specified level.

2. The method for storing gravitational potential energy of claim 1, wherein said lower elevation water body comprises Lake Ontario, said pumped storage upper elevation water body comprises Lake Erie, said river comprises Niagara River and said waterfall comprises Niagara Falls.

3. The method for storing gravitational potential energy of claim 1, wherein said surface corridor comprises a ground surface corridor including at least a portion suitable for supporting a ground vehicle thereon.

4. The method for storing gravitational potential energy of claim 1, wherein said surface corridor comprises a waterway capable of supporting a marine vehicle thereon.

5. The method for storing gravitational potential energy of claim 1, wherein deployment of said deployable water deflection subsystem located upstream of said waterfall (i) reduces water flow rate in the river flowing from said pumped storage upper elevation water body to said waterfall and (ii) correspondingly reduces loss of pumped storage gravitational potential energy associated with said water flow rate in the river flowing out from said pumped storage upper elevation water body to said waterfall.

6. The method for storing gravitational potential energy of claim 1, wherein said input energy comprises renewable source energy sourced from at least two of: (i) an onshore solar power system, (ii) an offshore solar power system, (iii) an onshore wind power system, (iv) an offshore wind power system, (v) a flying wind power system, (vi) a hydroelectric power system, (vii) a hydrokinetic power system, (viii) a tidal power system, (ix) an ocean thermal power system, (x) a trans-ice thermal power system, and (xi) a geothermal power system.

7. The method for storing gravitational potential energy of claim 1, wherein said method for storing gravitational potential energy further comprises shunting some of said input electrical energy to an additional storage system when said pumped storage upper elevation water body level nears a maximum upper elevation water body level; and wherein said additional storage system comprises at least one of a battery bank, a chemical energy storage system, a hydrogen energy storage system, a flywheel energy storage system, and a pressurized gas energy storage system.

8. A method for storing and retrieving gravitational potential energy using a pumped storage upper elevation water body having a natural gravity driven outlet flow through a river to a waterfall and then to a lower elevation water body, comprising:

during a surplus power production time window, the steps of:

transmitting input electrical energy including renewable energy to a pump, using said input electrical energy to said pump, to pump water from said lower elevation water body to said pumped storage upper elevation water body as commanded by a control system, with said water being pumped through a pressure-containing pipe at least partially traversing beneath a surface corridor suitable for supporting a vehicle thereupon and with said water being pumped having an upward water flow with opposed direction relative to said natural gravity driven outlet flow through said river to said waterfall and then to said lower elevation water body; and raising the water level in said upper elevation water body to store gravitational potential energy; and during a deficit power production time window, the steps of:

opening a valve for water to flow downward into said pressure-containing pipe from at least one of said pumped storage upper elevation water body and said river upstream of said waterfall, with opening said valve occurring as commanded by said control system, when said natural gravity driven outlet flow through said river to said waterfall is above a minimum specified value;

retrieving gravitational potential energy by flowing water from said pumped storage upper elevation water body through said pressure-containing pipe and then through a turbine and then to outflow to said lower elevation water body; and driving a generator which converts mechanical energy from said turbine to output electrical energy.

9. The method for storing and retrieving gravitational potential energy of claim 8, wherein said input electrical energy during said surplus power production time window comprises energy from daytime solar power harvesting, and wherein said output electrical energy from said generator driven by said turbine provides nighttime electric power into an electrical grid during said deficit power production time window.

10. The method for storing and retrieving gravitational potential energy of claim 8, further comprising (i) a monitoring subsystem, wherein said monitoring subsystem receives sensor inputs and synthesizes and outputs at least one of an environmental parameter and an erosion parameter and an ecological parameter and a visual appeal parameter; further comprising (ii) an operator interface subsystem for an operator to monitor outputs from said monitoring subsystem; and further comprising (iii) override means for transmitting an override command to said control system wherein said override command is issued from at least one of said operator interface subsystem and said monitoring subsystem.

11. The method for storing and retrieving gravitational potential energy of claim 8, wherein said control system includes a computer that (i) receives sensor inputs and (ii) incorporates a control algorithm that outputs a deployment command to a deployable water deflection subsystem located upstream of said waterfall.

12. The method for storing and retrieving gravitational potential energy of claim 8, wherein said control system outputs valve control commands to more than one controllable valve in said pressure-containing pipe.

13. The method for storing and retrieving gravitational potential energy of claim 12, wherein said more than one controllable valve comprise valves selected from at least one of the following valve types: (i) a safety shutoff valve for preventing flow in in said pressure-containing pipe following a failure event; (ii) a valve for controlling direction of flow in said pressure-containing pipe; (iii) a bypass valve; (iv) a bifurcation control valve; (v) a check valve; (vi) a rate-limiting valve; (vii) a pump flow control valve; and (viii) a turbine flow control valve.

14. The method for storing and retrieving gravitational potential energy of claim 8, wherein said control system communicates for coordination with at least one of (i) a secondary pumped storage system using a water flow path separate from said pressure-containing pipe, (ii) a secondary hydroelectric power system using a water flow path separate from said pressure-containing pipe, and (iii) a canal locks control system for controlling locks and water flows in a canal connecting said pumped storage upper elevation water body to said lower elevation water body.

15. The method for storing and retrieving gravitational potential energy of claim 8, wherein said control system has power and data connections to a smart grid that sources, provides and manages electrical power to grid-tied consumers.

16. A method for time-varying waterfall flow limiting for a waterfall with input flow from a pumped storage upper elevation water body through a river, comprising:
using renewable energy during a surplus power production time window to convert and store said renewable energy as gravitational potential energy in said pumped storage upper elevation water body by pumping water from a lower elevation water body downstream of said waterfall, to said pumped storage upper elevation water body;
measuring a water flow rate in said river, downstream of said pumped storage upper elevation water body and upstream of said waterfall, using a water flow rate sensor; and
controlling a deployable water deflection subsystem by control through actuation, when measured water flow rate from said water flow sensor differs from a waterfall flow rate target function;
wherein said deployable water deflection subsystem is located upstream of said waterfall and wherein said control through actuation of said water deflection subsystem limits water flow rate and modifies at least one of water velocity direction, water velocity magnitude, water kinetic energy, waterfall visual appearance, waterfall stream pattern, waterfall spray pattern, waterfall mist pattern, and waterfall sound.

17. The method for time-varying waterfall flow limiting of claim 16, wherein said waterfall flow rate target function comprises a command synthesis function for maintaining water flow rate over said waterfall to at least a minimum specified value, said minimum specified value being at least one of a first function of time of day and a second function of time of week and a third function of time of month and a fourth function of time of year.

18. The method for time-varying waterfall flow limiting of claim 16, wherein said control through actuation of said water deflection subsystem acts to reduce erosion in at least one of said river and said waterfall.

19. The method for time-varying waterfall flow limiting of claim 16, further comprising a camera capturing a view of said waterfall and an image analysis program acting on said view to compute a visual appeal parameter, and wherein said visual appeal parameter is an input to a computer in said deployable water deflection subsystem.

20. The method for time-varying waterfall flow limiting of claim 16, wherein said deployable water deflection subsystem comprises at least one of: a deployable barrier, a deployable sluice, a deployable weir, a deployable gate, a deployable dam, a deployable flow diverter, a deployable vane, a deployable vortex generator, a deployable control surface, a deployable rake, a deployable strainer, a deployable mesh, and a deployable nozzle.

* * * * *